(12) United States Patent
Katsube et al.

(10) Patent No.: US 7,730,304 B2
(45) Date of Patent: Jun. 1, 2010

(54) DEVICE AUTHENTICATION INFORMATION INSTALLATION SYSTEM

(75) Inventors: Tomohiro Katsube, Chiba (JP); Hideki Date, Kanagawa (JP); Atsushi Sato, Tokyo (JP); Yuu Sugita, Tokyo (JP); Takayuki Miura, Tokyo (JP); Tsuyoshi Ono, Tokyo (JP); Kouji Miyata, Tokyo (JP)

(73) Assignee: Sony Corporation (JP)

( * ) Notice: Subject to any disclaimer, the term of this patent is extended or adjusted under 35 U.S.C. 154(b) by 1032 days.

(21) Appl. No.: 10/562,404

(22) PCT Filed: Jun. 30, 2004

(86) PCT No.: PCT/JP2004/009608

§ 371 (c)(1),
(2), (4) Date: Dec. 23, 2005

(87) PCT Pub. No.: WO2005/002133

PCT Pub. Date: Jun. 1, 2005

(65) Prior Publication Data

US 2006/0155990 A1 Jul. 13, 2006

(30) Foreign Application Priority Data

Jun. 30, 2003 (JP) .............................. 2003-188139
Jun. 17, 2004 (JP) .............................. 2004-179562

(51) Int. Cl.
*H04L 9/32* (2006.01)
*H04L 29/06* (2006.01)
*G06F 7/04* (2006.01)
*G06F 17/30* (2006.01)
*G06F 15/16* (2006.01)

(52) U.S. Cl. .................... 713/168; 713/170; 713/155; 726/2; 726/3

(58) Field of Classification Search .................. 713/168
See application file for complete search history.

(56) References Cited

U.S. PATENT DOCUMENTS

2002/0049912 A1* 4/2002 Honjo et al. ................. 713/201

(Continued)

FOREIGN PATENT DOCUMENTS

JP 2-093487 A 4/1990

(Continued)

*Primary Examiner*—Shin-Hon Chen
(74) *Attorney, Agent, or Firm*—Lerner, David, Littenberg, Krumholz & Mentlik, LLP

(57) ABSTRACT

A CE apparatus (9) is a terminal capable of including apparatus authentication information therein with a high degree of safety. A management server (7) encrypts apparatus authentication information and transmits the encrypted apparatus authentication information to a factory (5). A factory worker links a connection means (10) to a connector of the CE apparatus (9). The encrypted apparatus authentication information transmitted by the management server (7) to the factory (5) is supplied to the CE apparatus (9) in a state of being encrypted as it is by way of the connection means (10). The CE apparatus (9) includes an embedded write module for decrypting the encrypted apparatus authentication information and storing the apparatus authentication information in a storage unit. That is to say, the apparatus authentication information supplied by way of the connection means (10) is decrypted by the write module and stored in the storage unit employed in the CE apparatus (9). Since the apparatus authentication information is supplied to the CE apparatus (9) in a state of being encrypted as it is, the apparatus authentication information can be stored therein with a high degree of safety.

25 Claims, 18 Drawing Sheets

U.S. PATENT DOCUMENTS

| | | |
|---|---|---|
| 2003/0059051 A1 | 3/2003 | Hatano et al. |
| 2003/0172270 A1* | 9/2003 | Newcombe et al. ......... 713/168 |

FOREIGN PATENT DOCUMENTS

| | | |
|---|---|---|
| JP | 06-244832 A | 9/1994 |
| JP | 08-125651 A | 5/1996 |
| JP | 2001-134654 A | 5/2001 |
| JP | 2002-353958 A | 12/2002 |
| JP | 2002-366519 A | 12/2002 |
| JP | 2003-110543 A | 4/2003 |
| JP | 2003-134101 A | 5/2003 |

* cited by examiner

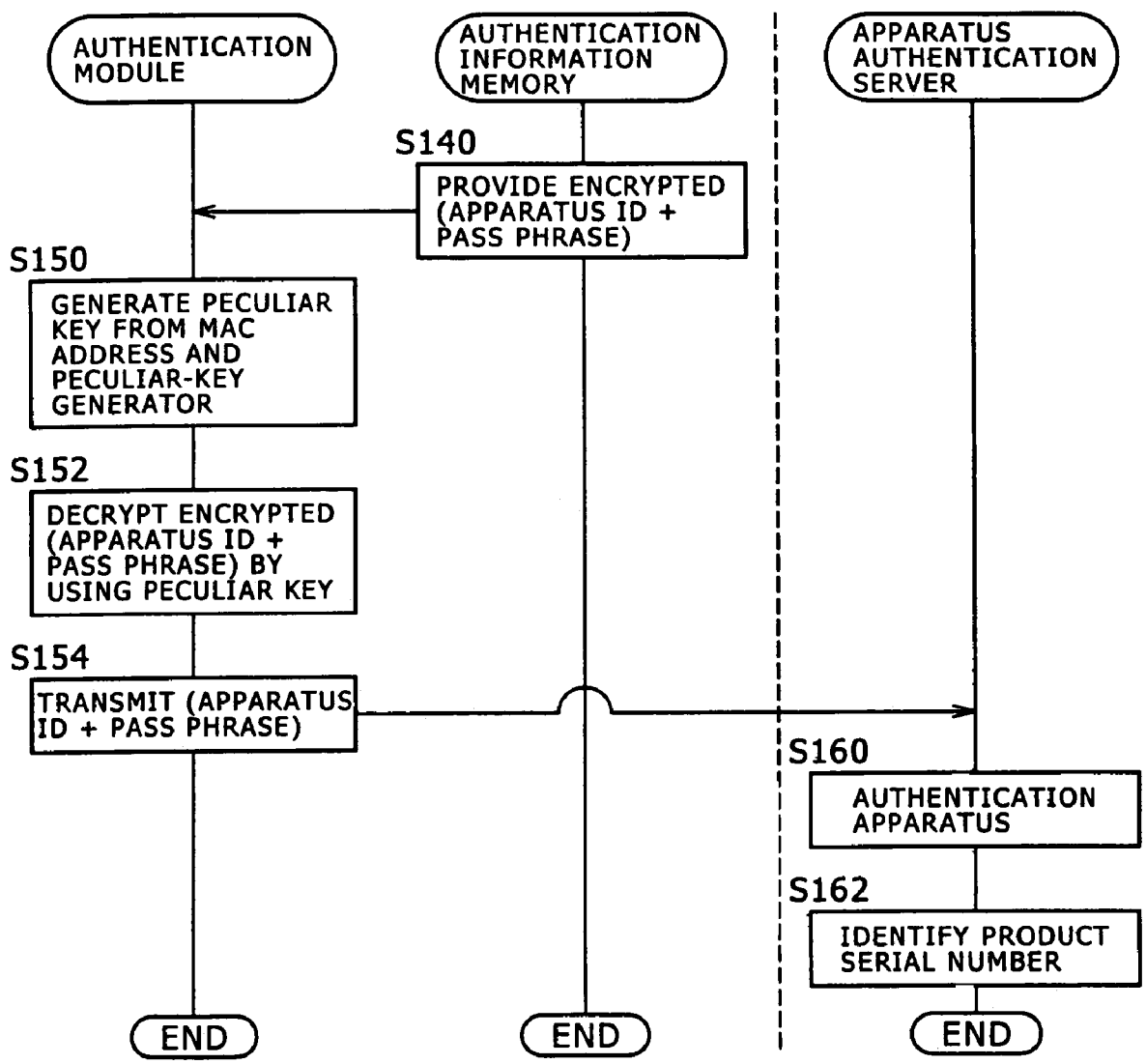

FIG. 8

FACTORY SYSTEM | MANAGEMENT SERVER

Table 700:

| KEY IDENTIFIER 1 | PRE-WRITE KEY 1 |
|---|---|
| KEY IDENTIFIER 2 | PRE-WRITE KEY 2 |
| KEY IDENTIFIER 3 | PRE-WRITE KEY 3 |
| .... | .... |

Table 500:

| PRODUCT CODE A | KEY IDENTIFIER 1 |
|---|---|
| PRODUCT CODE B | KEY IDENTIFIER 2 |
| PRODUCT CODE C | KEY IDENTIFIER 3 |
| .... | .... |

Table 702:

| APPARATUS ID 1 | PASS PHRASE 1 | KEY IDENTIFIER 1 |
|---|---|---|
| APPARATUS ID 2 | PASS PHRASE 2 | KEY IDENTIFIER 2 |
| APPARATUS ID 3 | PASS PHRASE 3 | KEY IDENTIFIER 3 |
| .... | .... | .... |

Table 704:

| APPARATUS ID 1 | PASS PHRASE 1 | PRODUCT SERIAL NUMBER 1 |
|---|---|---|
| APPARATUS ID 2 | PASS PHRASE 2 | PRODUCT SERIAL NUMBER 2 |
| APPARATUS ID 3 | PASS PHRASE 3 | PRODUCT SERIAL NUMBER 3 |
| .... | .... | .... |

FIG.14

AUTHENTICATION INFORMATION MANAGEMENT SERVER

706

| KEY IDENTIFIER 1 | PRE-WRITE KEY 1 |
|---|---|
| KEY IDENTIFIER 2 | PRE-WRITE KEY 2 |
| KEY IDENTIFIER 3 | PRE-WRITE KEY 3 |
| .... | .... |

708

| APPARATUS ID 1 | PASS PHRASE 1 |
|---|---|
| APPARATUS ID 2 | PASS PHRASE 2 |
| APPARATUS ID 3 | PASS PHRASE 3 |
| .... | .... |

710

| APPARATUS ID 1 | ENCRYPTED (APPARATUS ID 1 + PASS PHRASE 1) | PRODUCT SERIAL 1 | KEY IDENTIFIER 1 |
|---|---|---|---|
| APPARATUS ID 2 | ENCRYPTED (APPARATUS ID 2 + PASS PHRASE 2) | PRODUCT SERIAL 2 | KEY IDENTIFIER 2 |
| APPARATUS ID 3 | ENCRYPTED (APPARATUS ID 3 + PASS PHRASE 3) | PRODUCT SERIAL 3 | KEY IDENTIFIER 3 |
| .... | .... | .... | .... |

DEVICE AUTHENTICATION INFORMATION INSTALLATION SYSTEM

TECHNICAL FIELD

The present invention relates to apparatus such as a terminal. More particularly, the present invention relates to a technique for safely handling apparatus authentication information in an apparatus by encrypting the information, storing the encrypted information in the apparatus and decrypting the encrypted information in the apparatus.

BACKGROUND ART

In recent years, CE (Consumer Electronics) apparatus have been becoming popular and getting widely used. Examples of the CE apparatus are audio-visual apparatus such as a video deck, a stereo set and a television, household electronic appliances such as a rice cooker and a refrigerator and other electronic apparatus each including an embedded computer for deriving benefit from a service rendered through a network.

Services provided by servers include a service requiring that a CE apparatus be authenticated. For this reason, the CE apparatus includes apparatus authentication information embedded in advance at the factory as information used for authenticating the apparatus.

FIG. 18 is an explanatory diagram referred to in description of the conventional method to include apparatus authentication information in an apparatus. Apparatus authentication information to be included in CE apparatus is managed by a management server 107 of a management center 103.

The management server 107 transmits apparatus authentication information to a factory 105 serving as a factory manufacturing CE apparatus.

Since the apparatus authentication information is secret information that must be handled with strict confidence, the apparatus authentication information is transmitted to the factory 105 by making efforts to prevent the information from being leaked out to others.

At the factory 105, a connection means 110 is linked to a connector of a CE apparatus 109. The connection means 110 is a unit for receiving apparatus authentication information from the management server 107 and supplying the information to the CE apparatus 109.

The connection means 110 has an embedded function to decrypt encrypted apparatus authentication information. Thus, the connection means 110 is capable of decrypting encrypted apparatus authentication information received from the management server 107.

The connection means 110 then supplies the decrypted apparatus authentication information to the CE apparatus 109 to be stored in a storage unit employed in the CE apparatus 109.

As an invention for including apparatus authentication information in a CE apparatus as described above, there have been discovered an electronic-apparatus-manufacture system and an electronic-apparatus-manufacturing method, which are disclosed in Japanese Patent Laid-Open No. 2001-134654.

In accordance with this invention, on the basis of a product serial number written on a barcode label seal pasted on a CE apparatus, apparatus authentication information of the apparatus is read out from a database and included in the apparatus.

By the way, with the conventional method, the connection means 110 decrypts apparatus authentication information. It is thus quite within the bounds of possibility that the apparatus authentication information is leaked out from the connection means 110.

In recent years particularly, there are many cases in which low-cost overseas producers are entrusted with manufacturing of products. It is thus necessary to provide a mechanism for including apparatus authentication information transmitted to the factory 105 in a CE apparatus 109 with a high degree of reliability without leaking out the apparatus authentication information to others.

It is desired to provide a terminal or the like capable of including apparatus authentication information in an apparatus with a high degree of safety.

It is desired to confirm that apparatus authentication information has been included in an apparatus properly in a state of handling the information with strict confidence.

DISCLOSURE OF INVENTION

In order to achieve the above objects of the present invention, in accordance with configuration 1 of the present invention, there is provided an apparatus authentication information inclusion system, which includes a providing server and a terminal and is used for including apparatus authentication information in the terminal as information used by an apparatus authentication server to authenticate the terminal. The apparatus authentication information inclusion system is characterized in that:

the providing server provides source information used as a source for generating apparatus authentication information to the terminal and provides the apparatus authentication information or the source information to the apparatus authentication server for authenticating the terminal; and the terminal stores information as information necessary for transmitting the apparatus authentication information by using the received source information and, at a terminal authentication time, transmits the apparatus authentication information generated from the source information by using the stored information to the apparatus authentication server.

In accordance with configuration 2, in the apparatus authentication information inclusion system according to configuration 1, the providing server provides the terminal with a conversion value obtained as a result of a conversion process carried out by using a predetermined directional-function on apparatus authentication information generated from the source information;

the terminal generates a conversion value by execution of a conversion process using the predetermined directional-function on apparatus authentication information generated from the received-source information; and the terminal compares the generated conversion value with the conversion value received from the providing server to produce a result of determination as to whether the generated conversion value is equal to the received conversion value.

In accordance with configuration 3, in the apparatus authentication information inclusion system according to configuration 1, the terminal provides the providing server with a conversion value obtained as a result of a conversion process carried out by using a predetermined directional-function on apparatus authentication information generated from the source information, the providing server generates a conversion value by execution of a conversion process using the predetermined directional-function on apparatus authentication information generated from the received source information, and the providing server compares the generated conversion value with the conversion value received from the terminal to produce a result of determination as to whether or not the generated conversion value is equal to the received conversion value.

In order to achieve the above objects of the present invention, in accordance with configuration 4 of the present invention, there is provided a terminal characterized in that the terminal includes:

source-information acquisition means for acquiring source information provided by a providing server as a source used for generating apparatus authentication information;

generation means for generating apparatus authentication information from the acquired source information; and apparatus authentication information transmission means for transmitting the generated apparatus authentication information to an apparatus authentication server at an apparatus authentication time.

In accordance with configuration 5, in the terminal according to configuration 4, the source information is encrypted apparatus authentication information obtained as a result of a process to encrypt the apparatus authentication information, and the generation means generates the apparatus authentication information by decrypting the encrypted apparatus authentication information.

In accordance with configuration 6, the terminal according to configuration 4 further has storage means for encrypting apparatus authentication information generated by the generation means and storing a result of encrypting the apparatus authentication information, wherein the apparatus authentication information transmission means decrypts apparatus authentication information stored in the storage means and transmits a result of decrypting the apparatus authentication information.

In accordance with configuration 7, the terminal according to configuration 6 further has key generation means, which is used for generating an encryption key for processes to encrypt apparatus authentication information to be stored into the storage means and decrypt apparatus authentication information stored in the storage means by using information peculiar to the terminal when it is desired to utilize the encryption key.

In accordance with configuration 8, the terminal according to configuration 7 further has key deletion means for deleting the generated encryption key within a predetermined period right after use of the encryption key.

In accordance with configuration 9, the terminal according to configuration 4 further has:

conversion-value acquisition means for acquiring a conversion value obtained as a result of a conversion process carried out by using a predetermined one-directional function on the apparatus authentication information from the providing server;

conversion-value computation means for computing a conversion value by execution of a conversion process using the predetermined one-directional function on the generated apparatus authentication information; and determination means for producing a result of determination as to whether or not the acquired conversion value is equal to the computed conversion value.

In accordance with configuration 10, the terminal according to configuration 9 further has:

conversion-value computation means for computing a conversion value by execution of a conversion process using another one-directional function on the generated apparatus authentication information; and conversion-value-providing means for providing the computed conversion value to the providing server.

In accordance with configuration 11, the terminal according to configuration 4 further has:

conversion-value computation means for computing a conversion value by execution of a conversion process using a predetermined one-directional function on the generated apparatus authentication information; and conversion-value-providing means for providing the computed conversion value to the providing server.

In accordance with configuration 12, the terminal according to configuration 4 further has storage means for storing the acquired source information, wherein the apparatus authentication information transmission means generates apparatus authentication information from the stored source information and transmits the apparatus authentication information to the apparatus authentication server.

In order to achieve the above objects of the present invention, in accordance with configuration 13 of the present invention, there is provided an apparatus authentication information processing method adopted in a terminal implemented as a computer including source-information acquisition means, generation means and apparatus authentication information transmission means. The apparatus authentication information processing method is characterized in that the apparatus authentication information processing method has:

a source-information acquisition step of driving the source-information acquisition means to acquire source information provided by a providing server as a source used for generating apparatus authentication information;

a generation step of driving the generation means to generate apparatus authentication information from the acquired source information; and an apparatus authentication information transmission step of driving the apparatus authentication information transmission means to transmit the generated apparatus authentication information to an apparatus authentication server at an apparatus authentication time.

In accordance with configuration 14, by the apparatus authentication information processing method according to claim 13, the source information is encrypted apparatus authentication information obtained as a result of a process to encrypt the apparatus authentication information; and at the generation step, the apparatus authentication information is generated by decrypting the encrypted apparatus authentication information.

In accordance with configuration 15, the apparatus authentication information processing method according to claim 13 further has a storage step of encrypting apparatus authentication information generated by the generation means and storing a result of encrypting the apparatus authentication information into storage means also employed in the computer whereby, at the apparatus authentication information transmission step, apparatus authentication information stored in the storage means is decrypted and transmitted.

In accordance with configuration 16, the computer adopting the apparatus authentication information processing method according to claim 15 further has key generation means, and the apparatus authentication information processing method further has a key generation step of driving the key generation means to generate an encryption key prior to use of the encryption key in processes to encrypt apparatus authentication information to be stored into the storage means and decrypt apparatus authentication information stored in the storage means by using information peculiar to the terminal.

In accordance with configuration 17, the computer adopting the apparatus authentication information processing method according to claim 16 further has-key generation means, and the apparatus authentication information processing method further has a key deletion step of driving the key deletion means to delete the generated encryption key within a predetermined period right after use of the encryption key.

In accordance with configuration 18, the computer adopting the apparatus authentication information processing method according to claim 13 further has conversion-value acquisition means, conversion-value computation means and determination means, and the apparatus authentication information processing method further includes:

a conversion-value acquisition step of driving the conversion-value acquisition means to acquire a conversion value obtained as a result of a conversion process carried out by using a predetermined one-directional function on the apparatus authentication information from the providing server;

a conversion-value computation step of driving the conversion-value computation means to compute a conversion value by execution of a conversion process using the predetermined one-directional function on the generated apparatus authentication information; and a determination step of driving the determination means to produce a result of determination as to whether or not the acquired conversion value is equal to the computed conversion value.

In accordance with configuration 19, the computer adopting the apparatus authentication information processing method according to claim 18 further has conversion-value computation means and conversion-value-providing means, and the apparatus authentication information processing method further includes:

a conversion-value computation step of driving the conversion-value computation means to compute a conversion value by execution of a conversion process using another one-directional function on the generated apparatus authentication information; and a conversion-value-providing step of driving the conversion-value-providing means to provide the computed conversion value to the providing server.

In accordance with configuration 20, the computer adopting the apparatus authentication information processing method according to claim 13 further has conversion-value computation means and conversion-value-providing means, and the apparatus-authentication information processing method further includes:

a conversion-value computation step of driving the conversion-value computation means to compute a conversion value by execution of a conversion process using a predetermined one-directional function on the generated apparatus authentication information; and a conversion-value-providing step of driving the conversion-value-providing means to provide the computed conversion value to the providing server.

In accordance with configuration 21, the computer adopting the apparatus authentication information processing method according to claim 13 further has storage means for storing the acquired source information and, at the apparatus authentication-information transmission step, apparatus authentication information is generated from the stored source information and transmitted to the apparatus authentication server.

In order to achieve the above objects of the present invention, in accordance with configuration 22 of the present invention, there is provided an apparatus authentication information processing program to be executed by a computer. The apparatus authentication information processing program is characterized in that the apparatus authentication information processing program includes:

a source-information acquisition function of acquiring source information provided by a providing server as a source used for generating apparatus authentication information;

a generation function of generating apparatus authentication information from the acquired source information; and an apparatus authentication information transmission function of transmitting the generated apparatus authentication information to an apparatus authentication server at an apparatus authentication time.

In accordance with configuration 23, in an apparatus authentication information processing program according to claim 22, the source information is encrypted apparatus authentication information obtained as a result of a process to encrypt the apparatus authentication information, and the generation function generates the apparatus authentication information by decrypting the encrypted apparatus authentication information.

In accordance with configuration 24, the apparatus authentication information processing program according to claim 22 further has a storage function of encrypting apparatus authentication information generated by the generation function and storing a result of encrypting the apparatus authentication information, wherein the apparatus authentication information transmission function decrypts apparatus authentication information stored by the storage function and transmits a result of decrypting the apparatus authentication information.

In accordance with configuration 25, the apparatus authentication information processing program according to claim 24 further has a key generation function, which is to be executed by the computer to generate an encryption key for processes to encrypt apparatus authentication information to be stored by the storage function and decrypt apparatus authentication information stored by the storage function by using information peculiar to a terminal when it is desired to utilize the encryption key.

In accordance with configuration 26, the apparatus authentication information processing program according to claim 25 further has a key deletion function to be executed by the computer to delete the generated encryption key within a predetermined period right after use of the encryption key.

In accordance with configuration 27, the apparatus authentication information processing program according to claim 22 further has:

a conversion-value acquisition function to be executed by the computer to acquire a conversion value obtained as a result of a conversion process carried out by using a predetermined one-directional function on the apparatus authentication information from the providing server;

a conversion-value computation function to be executed by the computer to compute a conversion value by execution of a conversion process using the predetermined one-directional function on the generated apparatus authentication information; and a determination function to be executed by the computer to produce a result of determination as to whether or not the acquired conversion value is equal to the computed conversion value.

In accordance with configuration 28, the apparatus authentication information processing program according to claim 27 further has:

a conversion-value computation function to be executed by the computer to compute a conversion value by execution of a conversion process using another one-directional function on the generated apparatus authentication information; and a conversion-value-providing function to be executed by the computer to provide the computed conversion value to the providing server.

In accordance with configuration 29, the apparatus authentication information processing program according to claim 22 further has:

a conversion-value computation function to be executed by the computer to compute a conversion value by execution of a conversion process using a predetermined one-directional function on the generated apparatus authentication information; and a conversion-value-providing function to be executed by the computer to provide the computed conversion value to the providing server.

In accordance with configuration 30, the apparatus authentication information processing program according to claim 22 further has a storage function to be executed by the computer to store the acquired source information, wherein the apparatus authentication information transmission function generates apparatus authentication information from the stored source information and transmits an apparatus authentication information to the apparatus authentication server.

In order to achieve the above objects of the present invention, in accordance with configuration 31 of the present invention, there is provided a storage medium, which can be read by a computer and is used for storing an apparatus authentication information processing program to be executed by the computer to implement:

a source-information acquisition function of acquiring source information provided by a providing server as a source used for generating apparatus authentication information;

a generation function of generating apparatus authentication information from the acquired source information; and an apparatus authentication information transmission function of transmitting the generated apparatus authentication information to an apparatus authentication server at an apparatus authentication time.

In order to achieve the above objects of the present invention, in accordance with configuration 32 of the present invention, there is provided a providing server characterized in that the providing server includes:

source-information-providing means for providing a terminal with source information used as a source for generating apparatus authentication information;

apparatus authentication information providing means for providing the apparatus authentication information or the source information to an apparatus authentication server for authenticating the terminal;

conversion-value-acquisition means for acquiring a conversion value obtained as a result of a conversion process carried out by using a predetermined one-directional function on apparatus authentication information generated on the basis of the source information from the terminal;

conversion-value computation means for computing a conversion value by execution of a conversion process using the one-directional function on the apparatus authentication information; and determination means for producing a result of determination as to whether or not the acquired conversion value is equal to the computed conversion value.

In accordance with configuration 33, the providing server according to claim 32 further has determination-result transmission means for transmitting a determination result produced by the determination means to a main organization for including the source information.

In order to achieve the above objects of the present invention, in accordance with configuration 34 of the present invention, there is provided an apparatus authentication information providing method to be adopted in a computer, which includes source-information-providing means, apparatus authentication information providing means, conversion-value acquisition means, conversion-value computation means and determination means. The apparatus authentication information providing method is characterized in that the apparatus authentication information providing method includes:

source-information-providing step of driving the source-information-providing means to provide a terminal with source information used as a source for generating apparatus authentication information;

an apparatus authentication information providing step of driving the apparatus authentication information providing means to provide the apparatus authentication information or the source information to an apparatus authentication server for authenticating the terminal;

a conversion-value acquisition step of driving the conversion-value acquisition means to acquire a conversion value obtained as a result of a conversion process carried out by using a predetermined one-directional function on apparatus authentication information generated on the basis of the source information from the terminal;

a conversion-value computation step of driving the conversion-value computation means to compute a conversion value by execution of a conversion process using the one-directional function on the apparatus authentication information; and a determination step of driving the determination means to produce a result of determination as to whether or not the acquired conversion value is equal to the computed conversion value.

In accordance with configuration 35, the apparatus authentication information providing method according to claim 34 further has a determination-result transmission step of driving determination-result transmission means additionally employed in the computer as further means for transmitting a determination result produced by the determination means to a main organization for including the source information.

In order to achieve the above objects of the present invention, in accordance with configuration 36 of the present invention, there is provided an apparatus authentication information providing program to be executed by a computer to carry out:

a source-information-providing function of providing a terminal with source information used as a source for generating apparatus authentication information;

an apparatus authentication information providing function of providing the apparatus authentication information or the source information to an apparatus authentication server for authenticating the terminal;

a conversion-value acquisition function of acquiring a conversion value obtained as a result of a conversion process carried out by using a predetermined one-directional function on apparatus authentication information generated on the basis of the source information from the terminal;

a conversion-value computation function of computing a conversion value by execution of a conversion process using the one-directional function on the apparatus authentication information; and a determination function of producing a result of determination as to whether or not the acquired conversion value is equal to the computed conversion value.

In accordance with configuration 37, the apparatus authentication information providing program according to claim 36 further has a determination-result transmission function to be executed by the computer to transmit a determination result produced by the determination function to a main organization for including the source information.

In order to achieve the above objects of the present invention, in accordance with configuration 38 of the present invention, there is provided a storage medium, which can be read by a computer and is used for storing an apparatus authentication information processing program to be executed by the computer to implement:

a source-information-providing function of providing a terminal with source information used as a source for generating apparatus authentication information;

an apparatus authentication information providing function of providing the apparatus authentication information or the source information to an apparatus authentication server for authenticating the terminal;

a conversion-value acquisition function of acquiring a conversion value obtained as a result of a conversion process carried out by using a predetermined one-directional function on apparatus authentication information generated on the basis of the source information from the terminal;

a conversion-value computation function of computing a conversion value by execution of a conversion process using the one-directional function on the apparatus authentication information; and a determination function of producing a result of determination as to whether or not the acquired conversion value is equal to the computed conversion value.

In accordance with the present invention, apparatus authentication information can be included in an apparatus with a high degree of safety. In addition, it is also possible to verify that apparatus authentication information has been included properly in an apparatus with the apparatus authentication information kept in a confidential state as it is.

BRIEF DESCRIPTION OF DRAWINGS

FIG. 7 shows a flowchart referred to in explanation of a procedure adopted by an apparatus authentication server as a procedure for authenticating a CE apparatus in the first embodiment;

FIG. 8 is an explanatory diagram showing tables stored in apparatus such as an apparatus authentication server according to the first embodiment;

FIG. 14 is an explanatory diagram showing tables stored in apparatus such as an apparatus authentication server according to the second embodiment;

BEST MODE FOR CARRYING OUT THE INVENTION

Preferred embodiments of the present invention are explained in detail by referring to the diagrams as follows.

Outline of the First Embodiment

Figure 1:
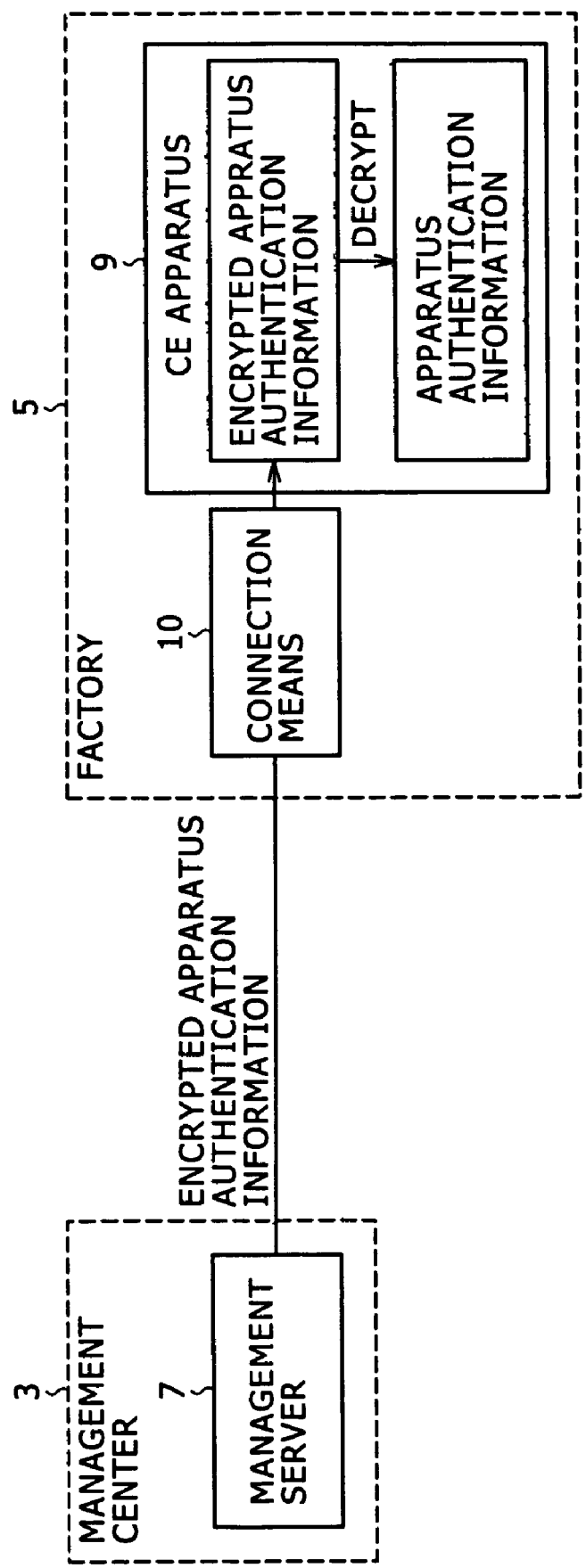
FIG. 1 is an explanatory diagram showing a first embodiment in a simple manner.

FIG. 1 is an explanatory diagram showing a first embodiment in a simple manner.

A management server 7 for managing apparatus authentication information is installed in a management center 3 and used for encrypting apparatus authentication information prior to transmission of the encrypted apparatus authentication information to a factory 5.

A connection means 10 is linked by a worker of the factory to a connector of a CE apparatus 9. The connection means 10 supplies apparatus authentication information received from the management server 7 in its encrypted state as it is to the CE apparatus 9.

The CE apparatus 9 includes an embedded write module for decrypting the encrypted apparatus authentication information and storing the result of the decryption in a storage unit.

As described above, the write module decrypts encrypted apparatus authentication information received from the connection means 10 and stores the result of the decryption into the storage unit embedded in the CE apparatus 9.

The connection means 10 is different from the connection means 110 used in the conventional system in that the connection means 10 does not decrypt apparatus authentication information received from the management server 7, but supplies the information to the CE apparatus 9 right away as it is.

As described above, in this embodiment, apparatus authentication information received from the management server 7 also referred to as a providing server is supplied to the CE apparatus 9 also referred to as a terminal in the encrypted state as it is to be decrypted in the CE apparatus 9. Thus, the security of the apparatus authentication information in the work to include the apparatus authentication information can be improved.

It is to be noted that the above description merely explains the basic concept of the embodiment. Thus, a variety of changes can be made to what is described above.

For example, as will be explained in detail in the following descriptions of embodiments, decrypted apparatus authentication information can be encrypted again by using another encryption key and stored in a storage unit so as to further improve the security of the information.

In addition, the factory 5 and the management center 3 each include a means for verifying that apparatus authentication information has been included in the CE apparatus 9.

Details of the First Embodiment

Figure 2:
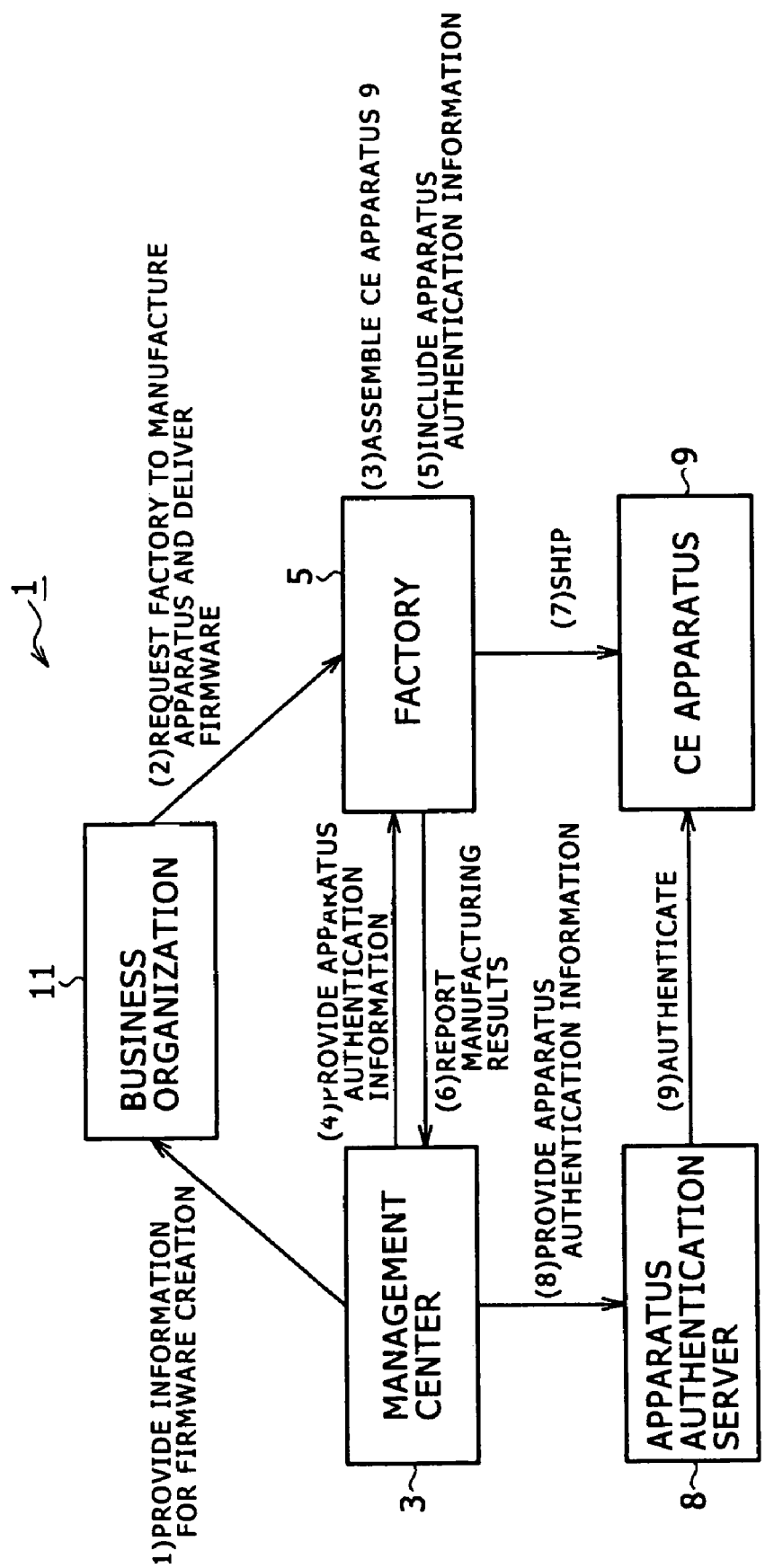
FIG. 2 is a diagram showing a typical configuration of a manufacturing/authentication system in the first embodiment.

FIG. 2 is a diagram showing a typical configuration of a manufacturing/authentication system 1 of CE apparatus. The manufacturing/authentication system 1 is a system for manufacturing and authenticating the CE apparatus 9. The figure shows neither a service server for rendering a service to the CE apparatus 9 nor other apparatus.

The manufacturing/authentication system 1 includes a business organization 11, a management center 3, a factory 5, a CE apparatus 9 and an apparatus authentication server 8.

The business organization 11 is a company for manufacturing the CE apparatus 9. The business organization 11 is a business enterprise for putting the CE apparatus 9 in the market. Activities of putting the CE apparatus 9 in the market include planning, development and sales of the CE apparatus 9.

The management center 3 is an organization for managing apparatus authentication information to be included in the CE apparatus 9. The management center 3 also manages issuances of apparatus authentication information and encryption information for the apparatus authentication information.

The factory 5 is an organization for manufacturing the CE apparatus 9 at a request made by the business organization 11. In some cases, the business organization 11 owns the factory 5. In other cases, the factory 5 is managed by a third party entrusted by the business organization 11 as a factory for manufacturing the CE apparatus 9.

The CE apparatus 9 manufactured at the factory 5 internally includes apparatus authentication information issued by the management center 3.

The apparatus authentication server 8 is a server for receiving apparatus authentication information from the management center 3 as well as apparatus authentication information from the CE apparatus 9 and authenticating the CE apparatus 9.

A CE apparatus 9 authenticated by the apparatus authentication server 8 is allowed to receive a service rendered by typically a service server.

Next, a process to manufacture the CE apparatus 9 in the manufacturing/authentication system 1 is explained by referring to reference numerals shown in the figure.

(1): First of all, the business organization 11 designs the CE apparatus 9 in accordance with a plan. Then, the business organization 11 acquires information used for creating firmware to be installed in the CE apparatus 9 from the management center 3.

This firmware includes a program for including apparatus authentication information in the CE apparatus 9 and a program for driving the CE apparatus 9. The firmware is installed in the CE apparatus 9 at the factory 5. The business organization 11 also obtains information for including apparatus authentication information in the CE apparatus 9 from the management center 3.

(2): The business organization 11 requests the factory 5 to manufacture the CE apparatus 9 and delivers the firmware to be installed in the CE apparatus 9 to the factory 5 by recording the firmware into a CD-ROM (Compact Disc—Read Only Memory) or by transmitting the firmware to the factory 5 by way of a network.

(3): At the factory 5, after the CE apparatus 9 has been assembled, the firmware received from the business organization 11 is installed in the CE apparatus 9. Then, the connection means 10 shown in FIG. 1 is linked to a connector of the CE apparatus 9. Subsequently, the factory 5 requests the management center 3 to transmit apparatus authentication information to the factory 5.

(4): At the request made by the factory 5, the management center 3 transmits apparatus authentication information to be installed in the CE apparatus 9 to the factory 5 by way of a network. The transmitted apparatus authentication information is encrypted information.

Since the original apparatus authentication information can be obtained by decrypting the encrypted apparatus authentication information, the encrypted apparatus authentication information can be regarded as a source for generating the original apparatus authentication information. The substance of the apparatus authentication information will be described later in detail.

(5): At the factory 5, the apparatus authentication information transmitted by the management center 3 is supplied to the CE apparatus 9 by way of the connection means 10. After the apparatus authentication information is decrypted in the CE apparatus 9 by using an encryption key included in the firmware installed in the CE apparatus 9, the result of the decryption process is re-encrypted by using another encryption key included in the firmware and stored in a storage medium employed in the CE apparatus 9.

(6) Then, in accordance with a method to be described later, the factory 5 and the management center 3 verify that the apparatus authentication information has correctly been included in the CE apparatus 9. The factory 5 can use the result of the verification to report a result of manufacturing to the management center 3.

(7): At the factory 5, after the process to assemble the CE apparatus 9 and the process to include the apparatus authentication information in the assembled CE apparatus 9 are completed, the CE apparatus 9 is shipped.

(8): The management center 3 provides the apparatus authentication information of the CE apparatus 9 to the apparatus authentication server 8.

(9): The apparatus authentication server 8 requests the CE apparatus 9 to transmit the apparatus authentication information to the CE apparatus 9, and compares the apparatus authentication information received from the management center 3 with the apparatus authentication information received from the CE apparatus 9 in order to authenticate the CE apparatus 9.

Figure 3:
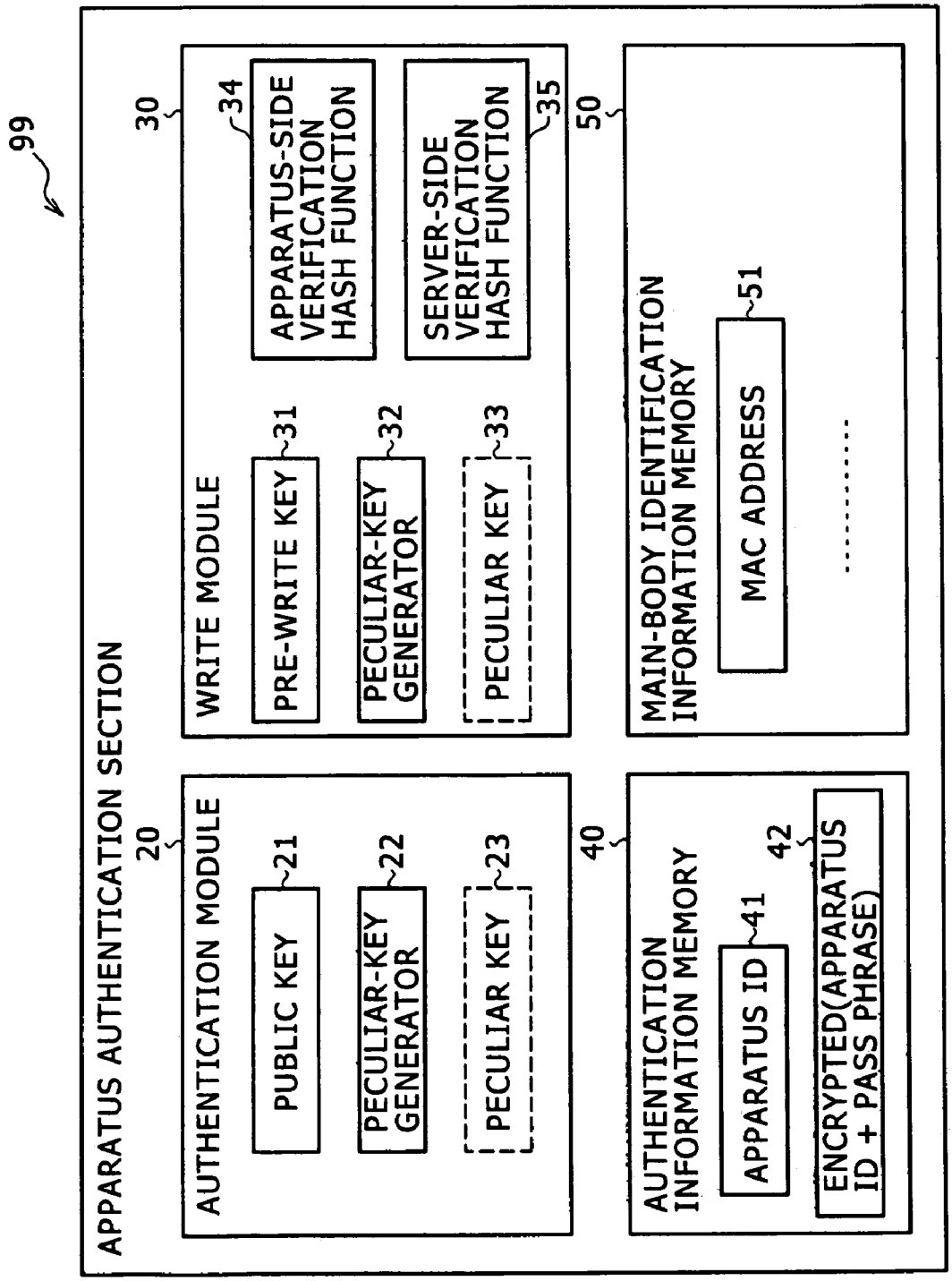
FIG. 3 is a diagram showing a typical configuration of an apparatus authentication section according to the first embodiment.

FIG. 3 is a diagram showing a typical configuration of an apparatus authentication section 99. The apparatus authentication section 99 is a functional section, which is formed inside the CE apparatus 9 by installing the firmware at the factory 5.

The apparatus authentication section 99 includes an authentication module 20, a write module 30, an authentication information memory 40 and a main-body identification-information memory 50.

The authentication module 20 is a functional section for providing the apparatus authentication server 8 with a facility for authenticating the CE apparatus 9.

The authentication module 20 has a public key 21 and a peculiar-key generator 22 for generating a peculiar key 23. The public key 21 and the peculiar key 23 are used in transmission of apparatus authentication information to the apparatus authentication server 8.

The peculiar key 23 is a key for encrypting and decrypting apparatus authentication information stored in the authentication information memory 40. Before the peculiar key 23 can be used, the peculiar key 23 must be generated in advance dynamically from the peculiar-key generator 22 and a MAC address 51.

The MAC address 51 is information peculiar to the CE apparatus 9. In addition, the peculiar key 23 is also generated as a key also peculiar to the CE apparatus 9.

In this embodiment, the peculiar key 23 is generated by using the MAC address 51. In actuality, the peculiar key 23 can be generated by using any other information as long as the other information is peculiar to the CE apparatus 9. An example of the other information is the address of i.Link (IEEE 1394).

That is to say, the peculiar key 23 is generated by using information peculiar to the CE apparatus 9 as a key also key peculiar to the CE apparatus 9.

As described above, even if the peculiar-key generator 22 included in the manufactured CE apparatus 9 is universal information, the generated peculiar key 23 varies from CE apparatus 9 to CE apparatus 9. Thus, the peculiar-key generator 22 can be managed with ease.

The authentication module 20 having the configuration described above reads out apparatus authentication information from the authentication information memory 40 and decrypts the apparatus authentication information prior to transmission to the apparatus authentication server 8 along with an apparatus ID 41.

After being used, the peculiar key 23 is deleted immediately within a predetermined period of time. The predetermined period of time can have a variety of lengths. For example, the predetermined period of time is a period between the start of a process to encrypt the apparatus authentication information and the end of a process carried out by the apparatus authentication section 99 to authenticate the CE apparatus 9.

As described above, this embodiment has a configuration in which the peculiar key 23 is deleted after being used. However, it is to be noted that it is not always necessary to delete the peculiar key 23.

The write module 30 is a functional section for writing apparatus authentication information into the CE apparatus 9 at the factory 5.

The write module 30 has a pre-write key 31, a peculiar-key generator 32, an apparatus-side verification hash function 34 and a server-side verification hash function 35.

The pre-write key 31 is a key for decrypting encrypted apparatus authentication information received from the management center 3.

The peculiar-key generator 32 is seed information for generating the peculiar key 33. The peculiar-key generator 32 is the same as the peculiar-key generator 22 of the authentication module 20.

The peculiar key 33 is a key for encrypting apparatus authentication information obtained as a result of a decryption process carried out by using the pre-write key 31. Before using the peculiar key 33, the peculiar key 33 must be generated in advance dynamically by using the peculiar-key generator 32 and the MAC address 51. The peculiar key 33 is the same as the peculiar key 23, which is generated in the authentication module 20.

The write module 30 having the configuration described above decrypts encrypted apparatus authentication information received from the management center 3, re-encrypts the result of the decryption by using the peculiar key 33 and stores the re-encrypted apparatus authentication information in the authentication information memory 40.

In this embodiment, by storing apparatus authentication information in a state of being encrypted by using the peculiar key 33 in the authentication information memory 40, the security of the apparatus authentication information can be improved.

Note that it is also possible to provide a configuration in which apparatus authentication information is stored in a storage unit without encrypting the apparatus authentication information by using the peculiar key 33. In this case, since the authentication module 20 does not need to decrypt the apparatus authentication information in an authentication process, it is not necessary to generate the peculiar key 23.

The apparatus-side verification hash function 34 is a function used by the write module 30 to verify that apparatus authentication information has been stored properly in the authentication information memory 40. As will be described later, the write-module 30 verifies that apparatus authentication information has been included in the CE apparatus 9 by comparison of a hash value transmitted from the management center 3 with a hash value generated by using the apparatus-side verification hash function 34 as the hash value of the apparatus authentication information.

The server-side verification hash function 35 is a function for generating a value to be used by the management center 3 to verify that apparatus authentication information has been stored properly in the authentication information memory 40.

As will be described later, the write module 30 transmits a hash value, which is generated by the server-side verification hash function 35 as the hash value of apparatus authentication information stored in the authentication information memory 40, to the management center 3.

The management center 3 compares the hash value received from the write module 30 with a hash value, which is generated by using a server-side verification hash value function as the hash value of the issued apparatus authentication information, in order to verify that apparatus authentication information has been included in the CE apparatus 9.

As obvious from the above description, the embodiment provides two types of hash function, i.e, the apparatus-side verification hash function 34 for generating a hash value for verification use in the CE apparatus 9 and the server-side verification hash function 35 for generating a hash value for verification use in the management server 7.

Let us assume for example that the same hash functions are used for verification in the CE apparatus 9 and the management server 7. Also let us assume that a third party returns a hash value transmitted by the management server 7 to the CE apparatus 9 back to the management server 7 as it is. In this case, it will be difficult for the management server 7 to determine whether the received hash value is a hash value transmitted by the CE apparatus 9 or the third party.

For the reason described above, the two types of hash function are used in order to prevent a third party from pretending to be the CE apparatus 9.

By the way, a hash function is a function for hashing an electronic text. By hashing an electronic text, it is possible to generate a character string peculiar to the text from the text.

The generated string of characters is referred to as the hash value of the electronic text or a digest message of the text.

The same hash values are obtained from the same electronic texts. If even only a portion of an electronic text is modified, a hash value obtained from the modified electronic text will be different from the hash value of the original electronic text.

In addition, it is extremely difficult to obtain the original electronic text by carrying out an inverse conversion process on the hash value of the text.

As described above, a hash function is a type of function referred to as a one-directional function, which allows a conversion process to be carried out in a forward direction with ease, but makes it extremely difficult to carry out an inverse conversion process of the hash function to obtain the original value from the hash value obtained as a result of the conversion process carried out in the forward direction.

As described above, both the side verifying secret information and the side holding the secret information to be verified generate a hash value of the information and compare the generated hash value with a hash value received from the other side. In this way, both the sides are capable of verifying that the two pieces of secret information are equal to each other with the confidential state of the secret information kept as it is.

The authentication information memory 40 is a storage unit for storing information to be used for authenticating the CE apparatus 9. The stored information includes the apparatus authentication information described above.

In the case of the embodiment, the stored information includes the apparatus ID 41 mentioned above and an encryption code 42 including an apparatus ID and a pass phrase.

The apparatus ID 41 is ID information used for identifying the CE apparatus 9. The factory 5 obtains the apparatus ID 41 from an apparatus-ID management organization in advance and stores the apparatus ID 41 in the CE apparatus 9.

An (apparatus ID+pass phrase) 42 including an apparatus ID and a pass phrase includes the apparatus ID 41 and an encrypted pass phrase at the tail of the apparatus ID 41. The pass phrase at the tail of the apparatus ID 41 has been encrypted by using the peculiar key 23 or the peculiar key 33. It is to be noted that the order in which the apparatus ID 41 and the pass phrase are arranged may be reversed.

In the following description, notation (information A+information B) denotes information composed of information A and information B placed at the tail of information A. Information obtained as a result of a process to encrypt the (information A+information B) is referred to as an encrypted (information A+information B).

Let us assume for example that the apparatus ID 41: is '123' and the pass phrase is 'abc'. In this case, the (apparatus ID+pass phrase) 42 including the apparatus ID 41 and the pass phrase is 123abc. A result of a process to encrypt the (apparatus ID+pass phrase) by using the peculiar key 23 or the peculiar key 33 is referred to as an encrypted (apparatus ID+pass phrase) 42.

The pass phrase is secret information, which is issued by the management server 7 to be included in apparatus authentication information in a process to include the apparatus authentication information in the CE apparatus 9 at the factory 5.

In this embodiment, an (apparatus ID+pass phrase) is used as apparatus authentication information.

By combining a pass phrase with the apparatus ID as described above, the amount of the apparatus authentication information can be increased. Thus, it is difficult for a third party to decrypt the encrypted (apparatus ID+pass phrase) 42. As a result, the security of the apparatus authentication information can be improved.

In addition, by comparing a decrypted (apparatus ID+pass phrase) with a received apparatus ID in the CE apparatus 9, it is also possible to verify that a combination of the apparatus ID and the encrypted (apparatus ID+pass phrase) is correct.

The main-body identification-information memory 50 is a storage unit for storing information used for identifying the main body of the CE apparatus 9.

Examples of the information used for identifying the main body of the CE apparatus 9 are a MAC (Media Access Control) address 51 and information referred to as i.Link. Used for identifying the CE apparatus 9 in the network, the MAC address 51 is information peculiar to the CE apparatus 9.

To put it concretely, the MAC address 51 is a hardware address unique to the CE apparatus 9. Thus, the MAC address 51 remains unchanged even if, for example, the CE apparatus 9 moves from a location to another in a network.

Next, the following description explains a procedure for including apparatus authentication information in the CE apparatus 9 with the configuration described above, a procedure for verifying the included apparatus authentication information and a procedure for authenticating the CE apparatus 9 by using the included apparatus authentication information.

Figure 4:
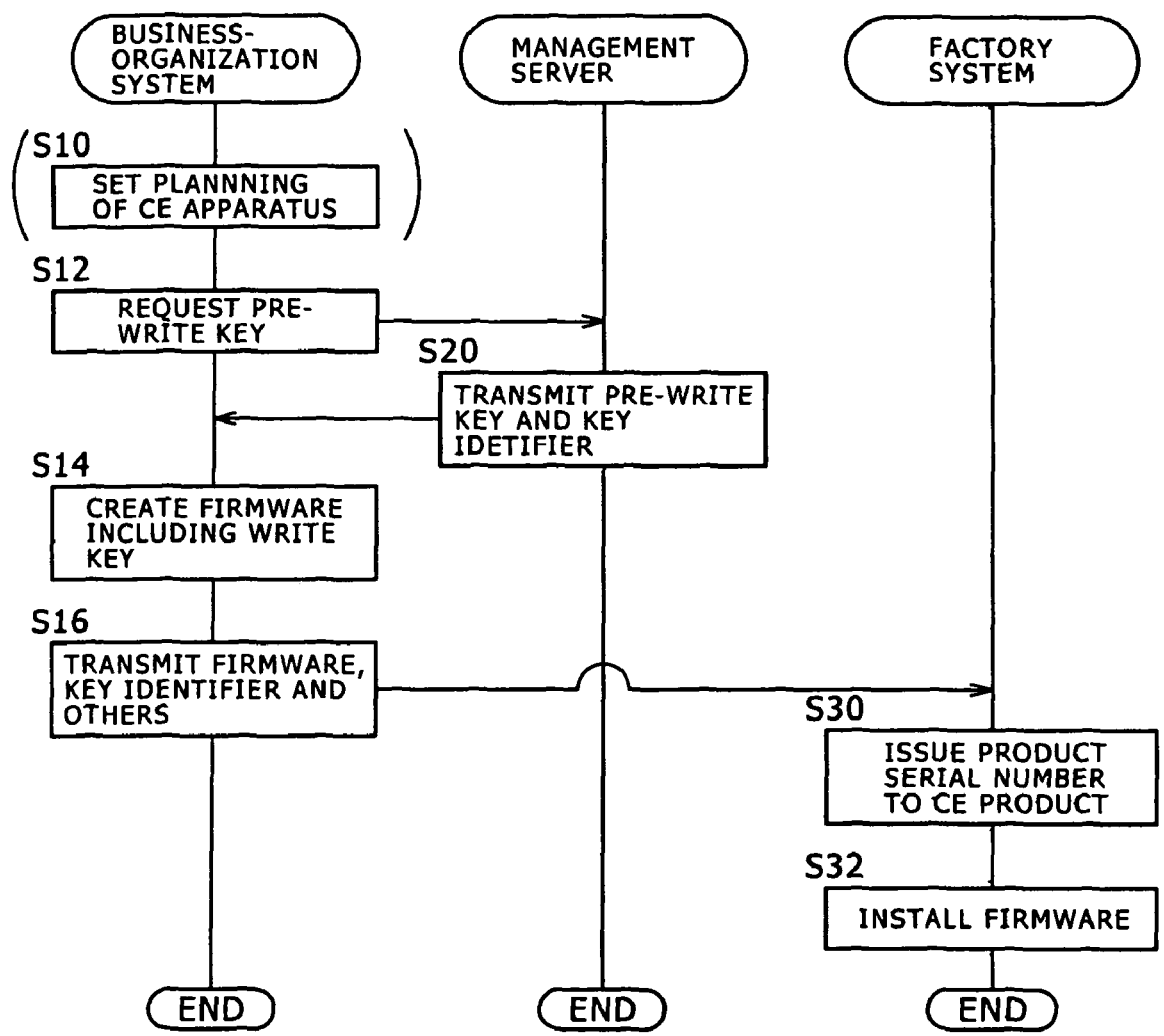
FIG. 4 shows a flowchart referred to in explanation of a work procedure executed at a preparatory stage of including apparatus authentication information in the first embodiment.

FIG. 4 shows a flowchart referred to in explanation of a work procedure executed at a preparatory stage of including apparatus authentication information in the CE apparatus 9.

First of all, at the first step 10, the business organization 11 sets a product plan of the CE apparatus 9. This product planning work is carried out manually by for example a person in charge of product planning.

Then, at the next step 12, a business-organization system set in the business organization 11 makes an access to the management server 7 to make a request for the pre-write key 31 for including apparatus authentication information in the write module 30 employed in the CE apparatus 9.

The management server 7 has a key table 700 like one shown in FIG. 8. From the key table 700, the management server 7 issues a pre-write key 31 and a key identifier for uniquely identifying the pre-write key 31 among other pre-write keys. Then, at a step 20, the management server 7 transmits the issued pre-write key 31 and the issued key identifier to the business-organization system.

The business organization 11 can have a configuration for requesting the management server 7 to transmit a product code used for identifying the type of the product and a peculiar-key generator to be described later to the business organization 11.

The management server 7 manages product codes and peculiar-key generators as pairs each consisting of one of the product codes and a peculiar-key generator corresponding to the product code.

At a step 14, the business-organization system creates firmware for receiving the pre-write key 31 and the key identifier from the management server 7 and for storing the pre-write key 31 in the write module 30. In addition, the business-organization system includes the peculiar-key generator in the firmware.

Then, at the next step 16, the business-organization system transmits the created firmware, the key identifier and a product code used for identifying the type of the CE apparatus 9 to a factory system set in at the factory 5.

At the factory 5, a plurality of CE apparatus 9 identified by the product codes is produced. It is to be noted, however, that all the produced CE apparatus use the same pre-write key 31.

For this reason, the created firmware and the key identifier can be transmitted to a pair factory for producing a plurality of CE apparatus 9 from the firmware and the key identifier, which form a pair.

The factory system receives these pieces of information from the business-organization system. Then, the factory 5 starts manufacturing CE apparatus 9 identified by the received product code.

At a step 30, the factory system issues a product serial number for the CE apparatus 9 manufactured in this way, that is, for a product manufactured before inclusion of the firmware.

A product serial number assigned to a CE apparatus 9 is a number peculiar to the CE apparatus 9. For example, a product serial number is a number or a barcode printed on a label seal, which is stuck on the CE apparatus 9 so that the product serial number can be referred to from a position outside the CE apparatus 9.

In the case of this embodiment, the product serial number assigned to a CE apparatus 9 is information used for identifying the CE apparatus 9. It is to be noted, however, that for example, a product code and a product serial number can also be used for identifying a CE apparatus 9.

In this case, the apparatus authentication server 8 sticks a product code and a product serial number on a CE apparatus 9.

That is to say, any information is applicable as long as the information can be used for identifying a CE apparatus 9.

Then, at the next step 32, the factory system includes the firmware in the CE apparatus 9.

The firmware is included in the CE apparatus 9 by supplying the firmware to the CE apparatus 9 by way of a connector of the CE apparatus 9.

The business organization 11 may deliver the firmware to the factory 5 by storing the firmware in a recording medium such as a CD-ROM. Then, at the factory 5, the firmware is read out from the recording medium to be included in the CE apparatus 9.

By inclusion of the firmware into the CE apparatus 9, the apparatus authentication section 99 shown in FIG. 3 is created inside the CE apparatus 9.

It is to be noted that, in the process to include the firmware into the CE apparatus 9, the factory system stores the apparatus ID 41 obtained in advance from an apparatus-ID management institution in the authentication information memory 40. At this stage, however, the (apparatus ID+pass phrase) 42 has not been stored in the authentication information memory 40.

Figure 5:
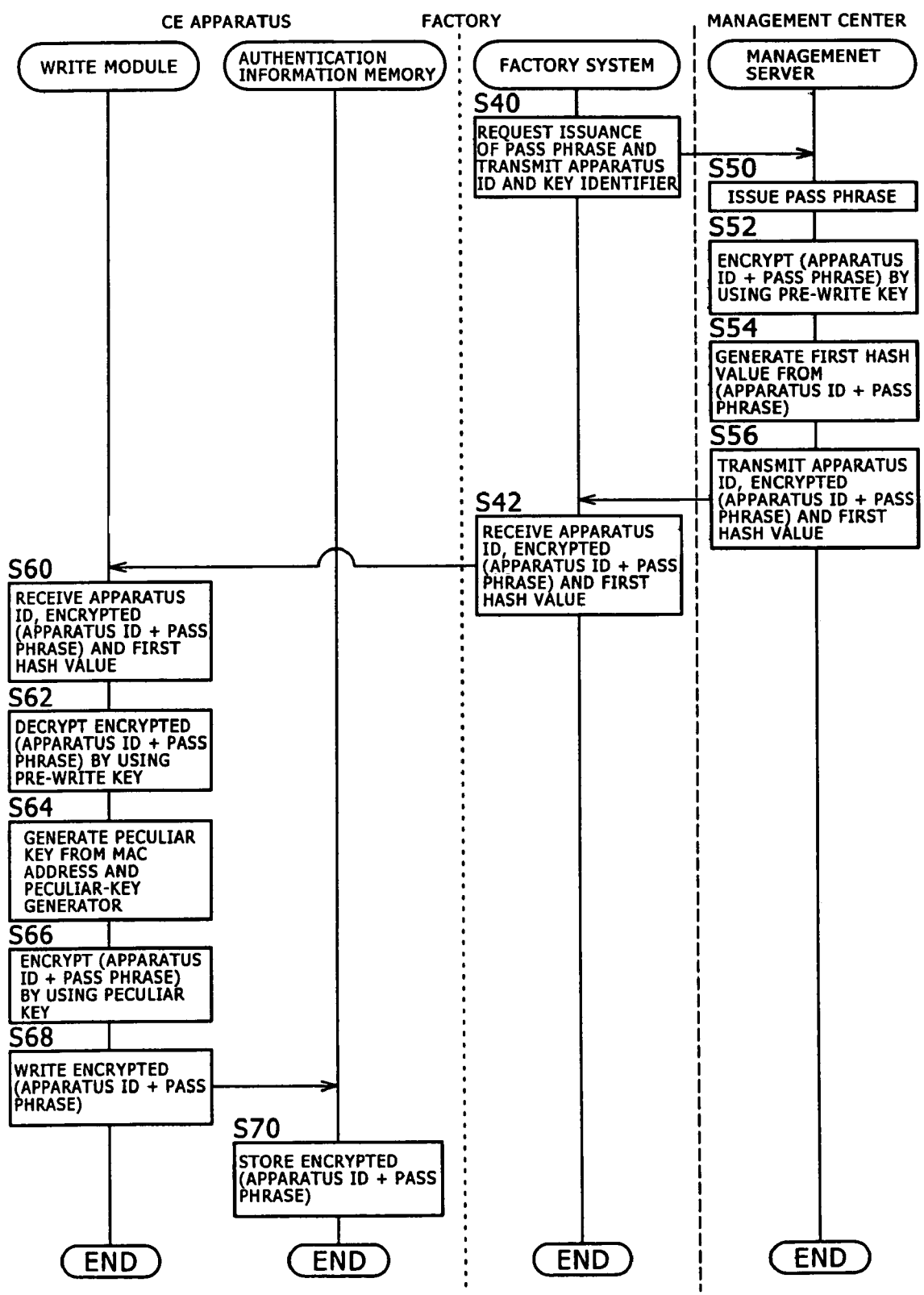
FIG. 5 shows a flowchart referred to in explanation of a procedure for including apparatus authentication information into a CE apparatus in the first embodiment.

FIG. 5 shows a flowchart representing a procedure for including apparatus authentication information into a CE apparatus 9, that is, a procedure for storing an (apparatus ID+pass phrase) 42 in the authentication information memory 40.

It is to be noted that the process of including apparatus authentication information into a CE apparatus 9 as described below is carried out with the connection means 10 connected to the CE apparatus 9.

The factory system has a key-identifier management table 500 like one shown in FIG. 8. The key-identifier management table 500 is a table for managing product codes representing products with key identifiers obtained from the business-organization system by associating the product codes with their respective key identifiers.

At a step 40, the factory system makes an access to the management server 7 in order to make a request for issuance of a pass phrase. In addition, the factory system transmits the apparatus ID 41 obtained earlier and a key identifier stored in the key-identifier management table 500 as the key identifier of the CE apparatus 9 to the management server 7.

At a step 50, the management server 7 issues a pass phrase at the request received from the factory system as a request for issuance of the pass phrase.

It is to be noted that a pass phrase is secret information created as a character string including characters, numbers and/or symbols. A pass phrase is information of the same type as a password.

A relatively short character string serving as secret information is referred to as a password. On the other hand, a relatively long character string serving as secret information is referred to as a pass phrase. For a third party, the longer the encrypted string of characters, the more difficult the string to decrypt.

Then, the management server 7 obtains a pre-write key 31 associated with the key identifier, which has been received from the factory system, from the key table 700 shown in FIG. 8.

Subsequently, at the next step 52, the management server 7 generates an (apparatus ID+pass phrase) from the apparatus ID 41 received from the factory system and the pass phrase generated at the step 50, encrypting the (apparatus ID+pass phrase) by using the pre-write key 31 obtained earlier to produce an encrypted (apparatus ID+pass phrase) 42.

The encrypted (apparatus ID+pass phrase) is used as apparatus authentication information.

Much like the CE apparatus 9, the management server 7 has an apparatus-side verification hash function-34 and a server-side verification hash function 35. Then, at the next step 54, the apparatus-side verification hash function 34 is used for generating the hash value of the (apparatus ID+pass phrase) generated earlier. The hash value of the (apparatus ID+pass phrase) is referred to as a first hash value.

The first hash value is used in the CE apparatus 9 in determining whether or not the apparatus authentication information has been included properly.

It is to be noted that the server-side verification hash function 35 generates a hash value to be used in the management server 7 in determining whether or not the apparatus authentication information has been included properly in the management server 7.

Then, at the next step 56, the management server 7 transmits the apparatus ID 41, the encrypted (apparatus ID+pass phrase) 42 generated above and the first hash value to the factory system. In this case, the management server 7 serves as a source-information-providing means.

It is to be noted that the management server 7 also has an issued apparatus authentication information table 702 shown in FIG. 8. When the management server 7 transmits the apparatus ID 41, the encrypted (apparatus ID+pass phrase) 42 and the first hash value to the factory system, the management server 7 also updates the issued apparatus authentication information table 702.

Thus, the issued pass phrase can be associated with an apparatus ID 41 and a key identifier.

At a step 42, the factory system receives these pieces of information from the management server 7 and supplies them to the CE apparatus 9 by way of the connection means 10.

At a step 60, the write module 30 employed in the CE apparatus 9 receives these pieces of information. The encrypted (apparatus ID+pass phrase) 42 corresponds to the source information. Thus, in this case, the write module 30 serves as a source-information acquisition means.

The first hash value corresponds to a result of a conversion process carried out on the apparatus authentication information by using a one-directional function. Thus, the write module 30 has a conversion-value acquisition means.

Then, at the next step 62, the write module 30 decrypts the encrypted (apparatus ID+pass phrase) 42 by using the pre-write key 31.

By carrying out the decryption process, the CE apparatus 9 is capable of obtaining the apparatus authentication information received from the management center 3. In this case, the apparatus authentication information is the (apparatus ID+pass phrase).

As described above, the write module 30 has generation means for generating apparatus authentication information from source information.

The CE apparatus 9 may save the decrypted (apparatus ID+pass phrase) in a memory as it is. In the case of this embodiment, however, the (apparatus. ID+pass phrase) is re-encrypted before being stored in the memory in order to enhance the security of the apparatus authentication information.

In order to carry out the re-encryption process, first of all, the write module 30 generates a peculiar key 33 from a MAC address 51 and a peculiar-key generator 32 at the following step 64.

This step is executed for the purpose of obtaining an encryption key peculiar to the CE apparatus 9. For example, this step is executed for the purpose of obtaining the peculiar key 33 by using the MAC address 51. However, the purpose of this step is not limited to this example. The step can also be executed by using any information as far as the information is peculiar to the CE apparatus 9. An example, a product serial number can be used.

In addition, as will be described later, the authentication module 20 is also capable of generating the same encryption key as the peculiar key 33. Thus, the write module 30 and the authentication module 20 both have a key generation means.

Then, at the next step 66, the write module 30 encrypts the (apparatus ID+pass phrase) by using the generated peculiar key 33 to generate an encrypted (apparatus ID+pass phrase) 42.

It is to be noted that, since the encryption key used in the re-encryption-process is different from the encryption key used in the encryption process, the encrypted (apparatus ID+pass phrase) 42 is different from the encrypted (apparatus ID+pass phrase) received from the management server 7.

Then, at the next step 68, the write module 30 supplies the encrypted (apparatus ID+pass phrase) 42 to the authentication information memory 40. Subsequently, at a step 70, the authentication information memory 40 stores the encrypted (apparatus ID+pass phrase) 42 therein.

It is to be noted that, in the case of a configuration in which the apparatus authentication section 99 is supposed to delete the peculiar key 33, the peculiar key 33 is deleted immediately by key deletion means after being used.

As described above, the encrypted (apparatus ID+pass phrase) 42 is peculiar to the CE apparatus 9 and a result of an encryption process using the peculiar key 33, which is generated dynamically. Thus, the security of the encrypted (apparatus ID+pass phrase) 42 can be improved.

The authentication information memory 40 serves as a storage means.

In accordance with the procedure described above, the apparatus authentication information issued by the management server 7 can be included in the CE apparatus 9.

In addition, since the apparatus authentication information is supplied to the CE apparatus 9 in a state of being encrypted as it is, it is possible to prevent in advance the apparatus authentication information from being leaked out at the factory 5. It is thus possible to improve the security required at the time the apparatus authentication information is included in the CE apparatus 9.

On the top of that, since the apparatus authentication information is stored in the CE apparatus 9 in a state of being re-encrypted by using an encryption key peculiar to the CE apparatus 9, it is possible to prevent in advance the apparatus authentication information from being leaked out from the CE apparatus 9 after the CE apparatus 9 is shipped. It is thus possible to improve the security required after shipping the CE apparatus 9.

Figure 6:
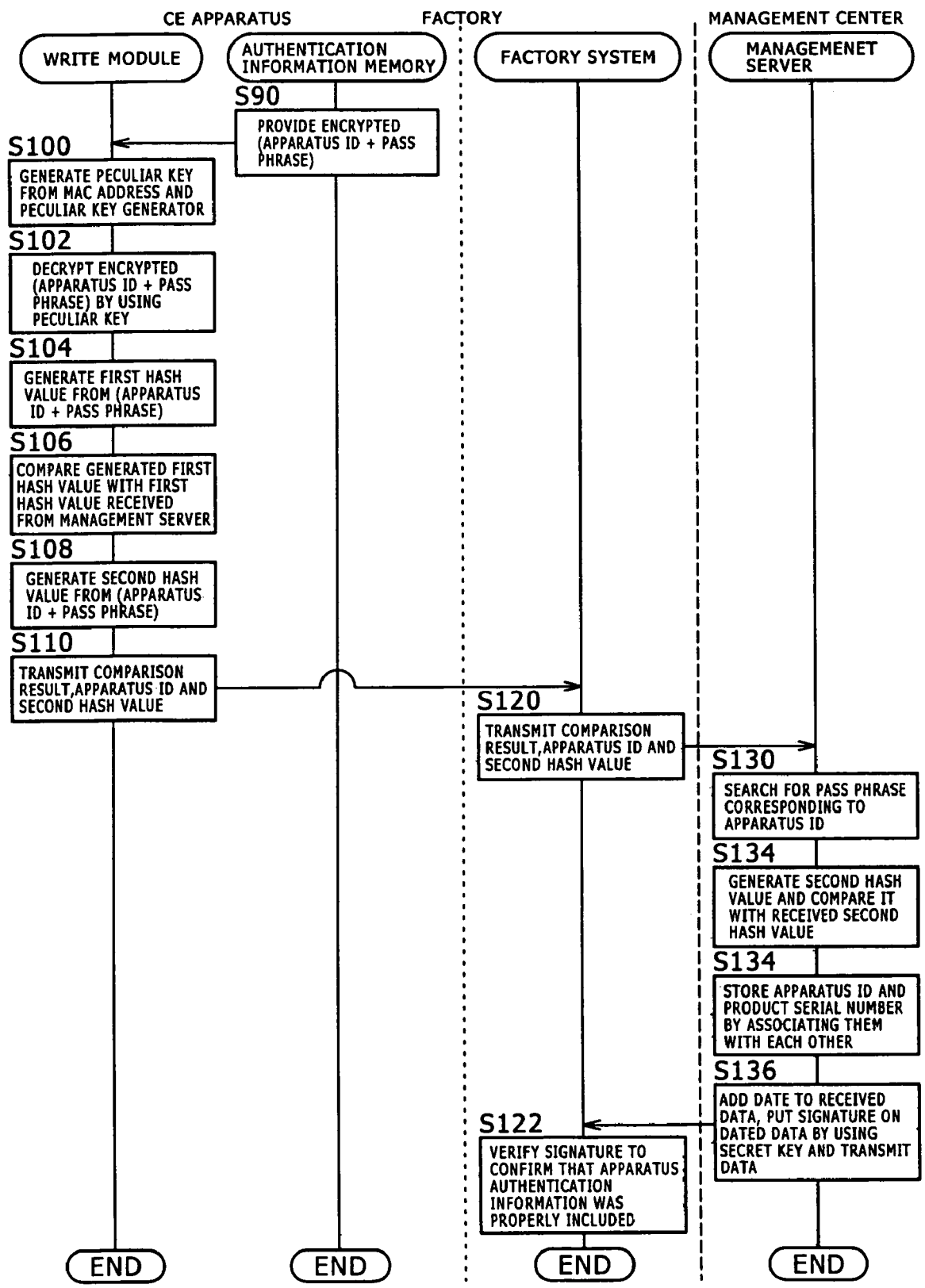
FIG. 6 shows a flowchart referred to in explanation of a procedure for verifying that apparatus authentication information has been included properly into a CE apparatus in the first embodiment.

FIG. 6 shows a flowchart referred to in explanation of a procedure executed by the management center 3 and the factory 5 as a procedure for verifying that apparatus authentication information has been included properly into the CE apparatus 9.

This procedure is executed with the connection means 10 already connected to the CE apparatus 9. Normally, the procedure is executed automatically after the factory system includes the apparatus authentication information in the CE apparatus 9.

First of all, at a step 90, the write module 30 employed in the apparatus authentication section 99 reads out the encrypted (apparatus ID+pass phrase) 42 from the authentication information memory 40. At this step, the encrypted (apparatus ID+pass phrase) 42 is transferred from the authentication information memory 40 to the write module 30.

Then, at a step 100, the write module 30 generates a peculiar key 33 from the peculiar-key generator 32 and the MAC address 51. Subsequently, at the next step 102, the write module 30 decrypts the encrypted (apparatus ID+pass phrase) 42 by using the peculiar key 33.

Then, at the next step 104, the write module 30 generates the hash value of the decrypted (apparatus ID+pass phrase) by using the apparatus-side verification hash function 34. The hash value of the decrypted (apparatus ID+pass phrase) is referred to as a first hash value.

Subsequently, at the next step 106, the write module 30 compares the first hash value received from the management server 7 with the hash value generated at the step 104 to produce a result of determination as to whether or not both the hash values are equal to each other.

Thus, the write module 30 has conversion-value computation means for computing the first hash value and a determination means.

A determination result indicating that both the hash values are equal to each other also proves that the (apparatus ID+pass phrase) generated by the management server 7 matches the (apparatus ID+pass phrase) stored in the authentication information memory 40.

Then, at the next step 108, the write module 30 generates the hash value of the (apparatus ID+pass phrase) by using the server-side verification hash function 35. The hash value of the (apparatus ID+pass phrase) generated by using the server-side verification hash function 35 is referred to as a second hash value.

Subsequently, at the next step 110, the write module 30 reads out the apparatus ID 41 from the authentication information memory 40, transmitting a determination result obtained at the step 106 as the result of comparison of both the first hash values, the apparatus ID 41, and the second hash value to the factory system. The second hash value is also transmitted to the management server 7.

As is obvious from the above description, the write module 30 has the conversion-value computation means and a conversion-value-providing means.

On the basis of the comparison result received from the CE apparatus 9, the factory is capable of knowing whether or not the apparatus authentication information has been properly included in the CE apparatus 9.

If the first hash values are not equal to each other, on the other hand, the apparatus ID 41 is discarded and an attempt is made to again include apparatus authentication information in the CE apparatus 9 by using a new apparatus ID.

The apparatus ID 41 resulting in information inclusion ending in a failure can also be reutilized. In the case of the embodiment, however, a apparatus ID 41 resulting in information inclusion ending in a failure is discarded to prevent a plurality of CE apparatus 9 having the same apparatus ID from being sold in the market mistakenly.

It is to be noted that, in the conventional manufacturing process, in order to maintain the confidentiality of apparatus authentication information, after the apparatus authentication information has once been included in a CE apparatus 9, it is difficult to determine whether or not the apparatus authentication information has been properly included in the CE apparatus 9 and, in some case, the fact that the apparatus authentication information has been properly included in the CE apparatus 9 is not verified.

In the case of this embodiment, however, hash values of apparatus authentication information are compared with each other in the CE apparatus 9. It is thus possible to determine whether or not the apparatus authentication information has been properly included in the CE apparatus 9 inside the CE apparatus 9 by keeping the apparatus authentication information confidential as it is.

After verifying that the apparatus authentication information has been properly included in the CE apparatus 9, at a step 120, the factory system transmits the apparatus ID 41 and the second hash value, which have been received from the CE apparatus 9, to the management server 7 along with a product serial number assigned to the CE apparatus 9.

At a step S130, the management server 7 receives these pieces of information from the factory system and searches the issued apparatus authentication information table 702 shown in FIG. 8 for a pass phrase corresponding to the received apparatus ID 41.

Thus, the management server 7 has conversion-value acquisition means for acquiring the second hash value.

Then, the management server 7 generates an (apparatus ID+pass phrase) from the apparatus ID 41 and the pass phrase found in the search operation, producing a second hash value of the (apparatus ID+pass phrase) by using the server-side verification hash function 35. Thus, the management server 7 has a conversion-value computation means.

Subsequently, at the next step 132, the management server 7 compares the second hash value-received from the factory system with the generated second hash value in order to determine whether or not both the second hash values are equal to each other. Thus, the management server 7 has a determination means.

If both the second hash values are found equal to each other, the management server 7 determines that the apparatus authentication information has been successfully included in the CE apparatus 9.

If both the second hash values are found unequal to each other, on the other hand, the management server 7 determines that the apparatus authentication information has not been successfully included in the CE apparatus 9.

The management server 7 has an apparatus authentication table 704 like one shown in FIG. 8. The apparatus authentication table 704 is a table for storing apparatus IDs 41, pass phrases and product serial numbers by associating the apparatus IDs 41, the pass phrases and the product serial numbers with each other.

At a step 134, the management server 7 stores the apparatus ID 41, the pass phrase and the product serial number in the apparatus authentication table 704 if both the second hash values are found equal to each other.

It is to be noted that the apparatus authentication table 704 is supplied to the apparatus authentication server 8 to be used by the apparatus authentication server 8 in authenticating the CE apparatus 9. Thus, the management server 7 serves as apparatus authentication information providing means in this case.

Next, at a step 136, the management server 7 adds a date, on which data was received from the factory system, to the data. The data received from the factory system is the apparatus ID 41, the product serial number and the second hash value. Then, the management server 7 puts a digital signature used as a secret key on the dated data before transmitting the dated data to the factory. In this case, the management server 7 serves as a determination-result transmission means.

At a step 122, the factory system serving as a source information inclusion main organization receives the dated data from the management server 7 and confirms that the apparatus authentication information has been included in the CE apparatus 9 properly.

In this way, the factory system is capable of confirming that the apparatus ID 41, the product serial number and the second hash value have been received by the management server 7. The apparatus ID 41, the product serial number and the second hash value can be regarded as a manufacturing result.

Then, the factory 5 ships the CE apparatus 9 completing the manufacturing process.

FIG. 7 shows a flowchart referred to in explanation of a procedure adopted by the apparatus authentication server 8 as a procedure for authenticating a CE apparatus 9.

First of all, at a step 140, the authentication module 20 employed in the apparatus authentication section 99 as shown in FIG. 3 reads out the encrypted (apparatus ID+pass phrase) 42 from the authentication information memory 40. Thus, the (apparatus ID+pass phrase) 42 is transferred from the authentication information memory 40 to the authentication module 20.

Then, at a step 150, the authentication module 20 generates a peculiar key 23 by using the peculiar-key generator 22 and the MAC address 51.

Subsequently, at the next step 152, the authentication module 20 decrypts the encrypted (apparatus ID+pass phrase) 42 by using the peculiar key 23 to obtain a (apparatus ID+pass phrase) and transmits the (apparatus ID+pass phrase) to the apparatus authentication server 8 at the next step 154. Thus, the authentication module 20 has an apparatus authentication information transmission means.

It is to be noted that a communication path between the CE apparatus 9 and the apparatus authentication server 8 is a path assuring security of exchanged data by using an encryption technology such as an SSL (Secure Socket Layer).

At a step 160, the apparatus authentication server 8 receives the (apparatus ID+pass phrase) from the CE apparatus 9 and decrypts the (apparatus ID+pass phrase) by using a secret key corresponding to the public key 21. Then, the apparatus authentication server 8 compares the decrypted pass phrase with the pass phrase stored in the apparatus authentication table 704 received from the management center 3 in order to authenticate the CE apparatus 9.

Then, at the next step 162, the apparatus authentication server 8 identifies the product serial number of the CE apparatus 9 from the apparatus authentication table 704.

This step is the end of the procedure for authenticating the CE apparatus.

Figure 9:
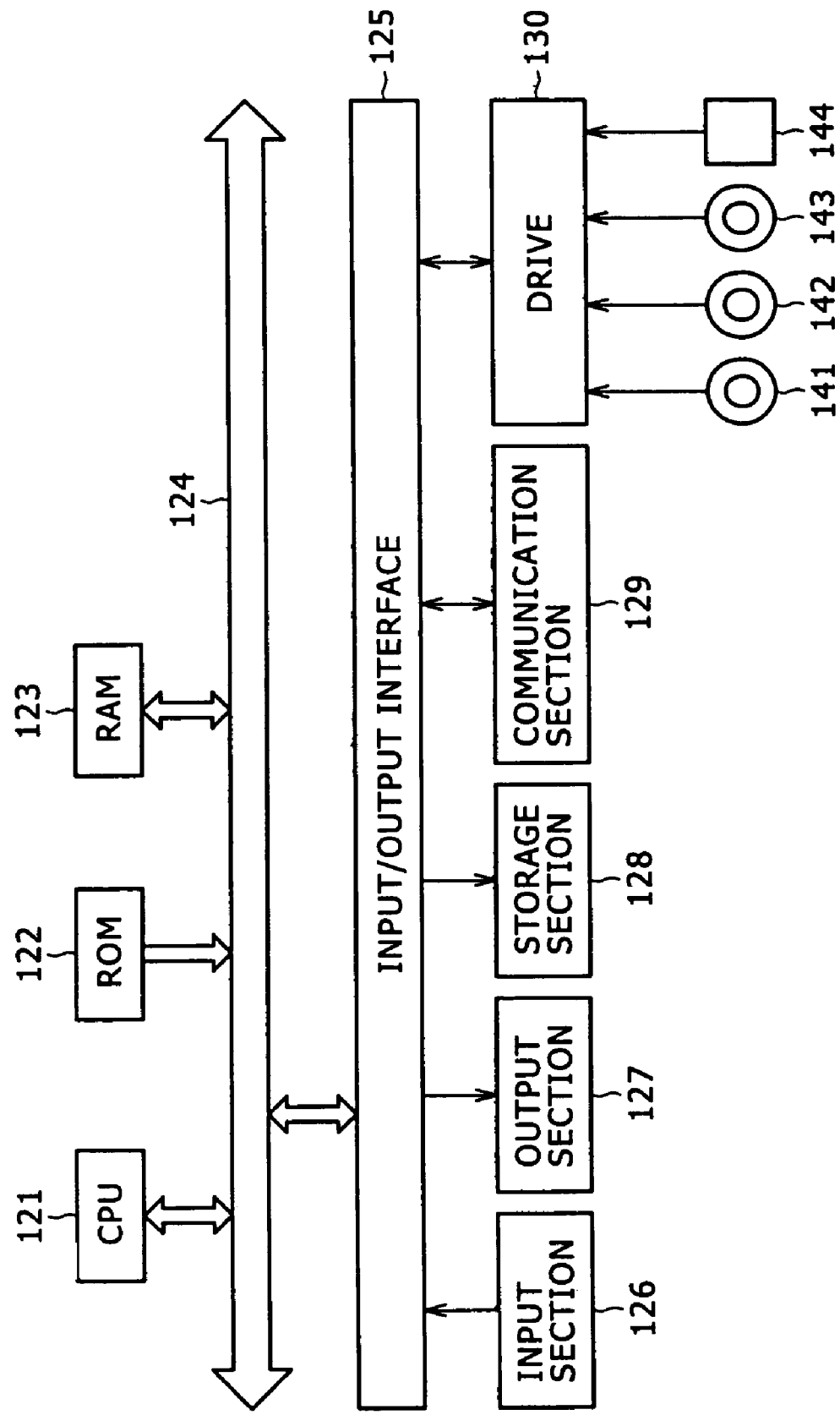
FIG. 9 is a diagram showing a typical hardware configuration of a CE apparatus according to the first embodiment.

FIG. 9 is a diagram showing a typical hardware configuration of the CE apparatus 9.

A CPU (Central Processing Unit) 121 is a central processing section for carrying out various kinds of processing by execution of programs stored in advance in a ROM (Read Only Memory) 122 or programs loaded from a storage section 128 into a RAM. (Random Access Memory) 123.

The ROM 122 is a memory used for storing basic programs necessary for execution of functions of the CE apparatus 9 and storing data such as parameters.

The RAM 123 is a memory used as a working area required by the CPU 121 for execution of the various kinds of processing.

The storage section 128 is a unit used for storing other programs necessary for execution of functions of the CE apparatus 9 and storing data. Examples of the storage section 128 are a hard disk and a semiconductor memory.

The firmware created in business organization 11 is stored in the storage section 128 at the factory 5. The CPU 121 executes the firmware to generate a variety of configuration elements shown in FIG. 3 as elements of the apparatus authentication section 99.

The other programs stored in the storage section 128 include an OS (Operating System) for inputting and outputting a file, controlling components of the CE apparatus 9 and carrying out basic functions.

The CPU 121, the ROM 122 and the RAM 123 are connected to each other by a bus 124. This bus 124 is also connected to an input/output interface 125.

The input/output interface 125 is connected to an input section 126, an output section 127, the storage section 128 cited above and a communication section 129. The input section 126 includes a keyboard and a mouse whereas the output section 127 includes a display unit and a speaker. The display unit can be a CRT (Cathode Ray Tube) display unit or an LCD (Liquid Crystal Display) unit. The storage section 128 typically includes a hard disk. The communication section 129 has a modem or a terminal adaptor.

The communication section 129 is a functional unit for carrying out communication processing with other apparatus through a network. For example, the communication section 129 is connected to the connection means 10 to receive apparatus authentication information or connected to the apparatus authentication server 8 to carry out communications for a process to authenticate the CE apparatus 9.

If necessary, the input/output interface 125 is also connected to a drive 140 on which a recording medium is properly mounted. The recording medium can be a magnetic disk 141, an optical disk 142, a magneto-optical disk 143 or a memory card 144. As described above, a computer program to be executed by the CPU 121 is loaded from the storage section 128 into the RAM 123 if necessary.

It is to be noted that, since the configurations of the management server 7 and apparatus authentication server 8 are basically the same as the configuration of the CE apparatus 9, the explanations of the configurations of the management server 7 and apparatus authentication server 8 are not given.

In accordance with the first embodiment described above, the (apparatus ID+pass phrase) required in the process to authenticate a CE apparatus 9 as apparatus authentication information can be transmitted from the management-server 7 to the CE apparatus 9 with a high degree of safety. In addition, the factory 5 and the management server 7 are capable of verifying that the apparatus authentication information has been correctly included in the CE apparatus 9.

Effects provided by the first embodiment described above are explained by comparing the embodiment with the conventional system as follows.

(1): In the conventional system, since the (apparatus ID+pass phrase) used as apparatus authentication information is a clear text supplied to the CE apparatus 9, it is quite within the bounds of possibility that a worker of the factory 5 or another person sees the apparatus authentication information either intentionally or not. In the case of this embodiment, on the other hand, the problem is solved by supplying the (apparatus ID+pass phrase) to the CE apparatus 9 in a state of being encrypted as it is.

(2): In the conventional system, even if the apparatus authentication information is encrypted before being transmitted to the factory 5, for example, the method for including apparatus authentication information into the CE apparatus 9 varies from product to product and from factory to factory, making it impossible to provide a uniform technique. It is thus quite within the bounds of possibility that dispersions in security level are resulted in. In the case of this embodiment, on the other hand, a common method for including apparatus authentication information into the CE apparatus 9 is adopted to reduce the number of dispersions in security level.

(3): In the case of the conventional system, an encryption key may be leaked out and affect another CE apparatus 9. In the case of this embodiment, on the other hand, a peculiar key 23 is generated for every CE apparatus 9 as a key peculiar to the CE apparatus 9 for which the peculiar key 23 is generated. Thus, even if a peculiar key 23 is leaked out, the peculiar key 23 does not affect another CE apparatus 9.

As for the pre-write key 31, the effect range can be limited by generating the pre-write key 31 for each product or for every period of time.

(4): In the case of the conventional system, it is difficult to verify that apparatus authentication information has been included correctly into the CE apparatus 9 at the factory 5 or the management center 3 serving as an originator issuing the apparatus authentication information. In the case of this embodiment, on the other hand, by using peculiar information such as a hash value, it is possible to verify that apparatus authentication information has been included correctly in the CE apparatus 9 at the factory 5 or the management center 3.

(5): In the case of the conventional system, it is difficult for the factory 5 to verify that the management center 3 has correctly received a report on a result of manufacturing. In the case of this embodiment, on the other hand, the management server 7 adds a date to data received from the factory system and puts a digital signature on the dated data before transmitting the dated data to the factory system.

(6): In the case of the conventional system, it is difficult to use other information such as an electronic certificate as apparatus authentication information. In the case of this embodiment, on the other hand, the present invention can be applied to an authentication method using an electronic certificate.

In the case of the embodiment, as an example, apparatus authentication information is transmitted to the factory 5 by way of a network and supplied to the CE apparatus 9 through the connection means 10. It is to be noted, however, that since the apparatus authentication information is supplied to the CE apparatus 9 in a state of being encrypted, it is also possible to provide a configuration in which the apparatus authentication information is recorded onto a storage medium such as a CD-ROM and the storage medium is then delivered to the factory 5 so that the factory 5 is capable of transferring the apparatus authentication information from the medium to the CE apparatus 9.

In addition, in the case of the embodiment, as an example, there is provided a configuration in which an encrypted (apparatus ID+pass phrase) received from the management server 7 is decrypted by using a pre-write key 31 before being stored in the authentication information memory 40. However, it is also possible to provide another configuration in which an encrypted (apparatus ID+pass phrase) received from the management server 7 is stored in the authentication information memory 40 right away without being decrypted and decrypted by using a pre-write key only before being used in an authentication process.

Next, a second embodiment is explained.

Outline of the Second Embodiment

Figure 10:
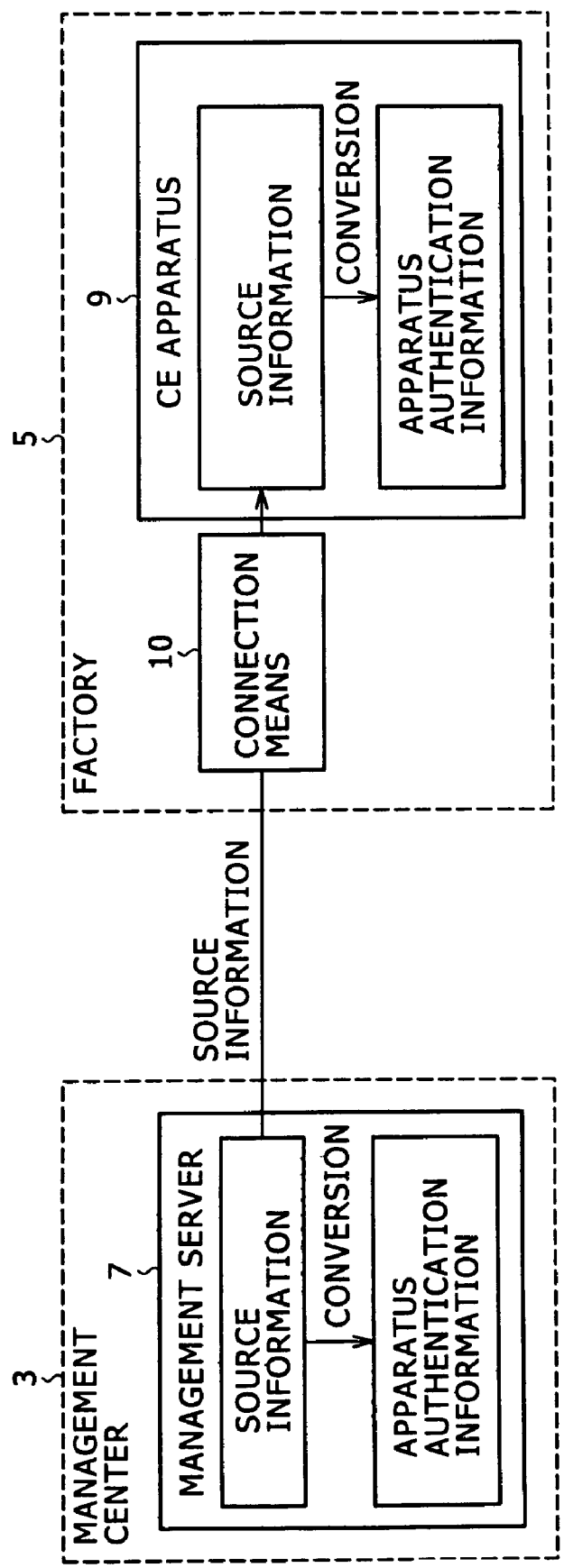
FIG. 10 is an explanatory diagram showing a second embodiment in a simple manner.

FIG. 10 is an explanatory diagram showing a second embodiment in a simple manner.

In the case of the embodiment, source information serving as the source for generating apparatus authentication information is converted into the apparatus authentication information by using the same logic in the management server 7 and the CE apparatus 9 in a process to generate the apparatus authentication information. For example, the source information is encrypted to generate the apparatus authentication information in the same encryption process using the same encryption key in the management server 7 and the CE apparatus 9.

First of all, the management server 7 transmits the source information to the factory 5 and converts the source information into apparatus authentication information in a process to generate the apparatus authentication information.

At the factory 5, on the other hand, the source information is supplied to the CE apparatus 9 by way of the connection means 10. Then, the CE apparatus 9 converts the received source information into apparatus authentication information.

As is obvious from the above description, the management server 7 and the CE apparatus 9 are thus capable of sharing the same apparatus authentication information.

In addition, even if the source information is leaked out to another person, the person will not be capable of knowing the apparatus authentication information unless the person knows the logic for converting the source information into the apparatus authentication information.

As described above, since the apparatus authentication information is generated by an internal section in the CE apparatus 9, it is possible to prevent the apparatus authentication information from being output in the form of a plain text at the factory 5.

Details of the Second Embodiment

The configuration of the manufacturing/authentication system 1 is the same as the configuration shown in FIG. 2 as the configuration according to the first embodiment, and the configuration of the apparatus authentication section 99 is the same as the configuration shown in FIG. 3 as the configuration according to the first embodiment. Thus, the explanations of these configurations are not repeated.

In addition, every configuration element employed in the second embodiment as a configuration identical with its counterpart employed in the first embodiment is explained by denoting the configuration element by the same reference numeral as the counterpart.

In the following description, methods of including apparatus authentication information into a CE apparatus 9, verifying the inclusion, and authenticating the CE apparatus 9 are explained by referring to flowcharts.

It is to be noted that, since preparation for inclusion of apparatus authentication information into a CE apparatus 9 is the same as that of the first embodiment, the explanation with reference to FIG. 4 is not repeated.

Much like the first embodiment, the management server 7 has a key table 706 like one shown in FIG. 14. The key table 706 is a table used for managing key identifiers and pre-write keys 31 by associating the key identifiers and the pre-write keys 31 with each other.

Figure 11:
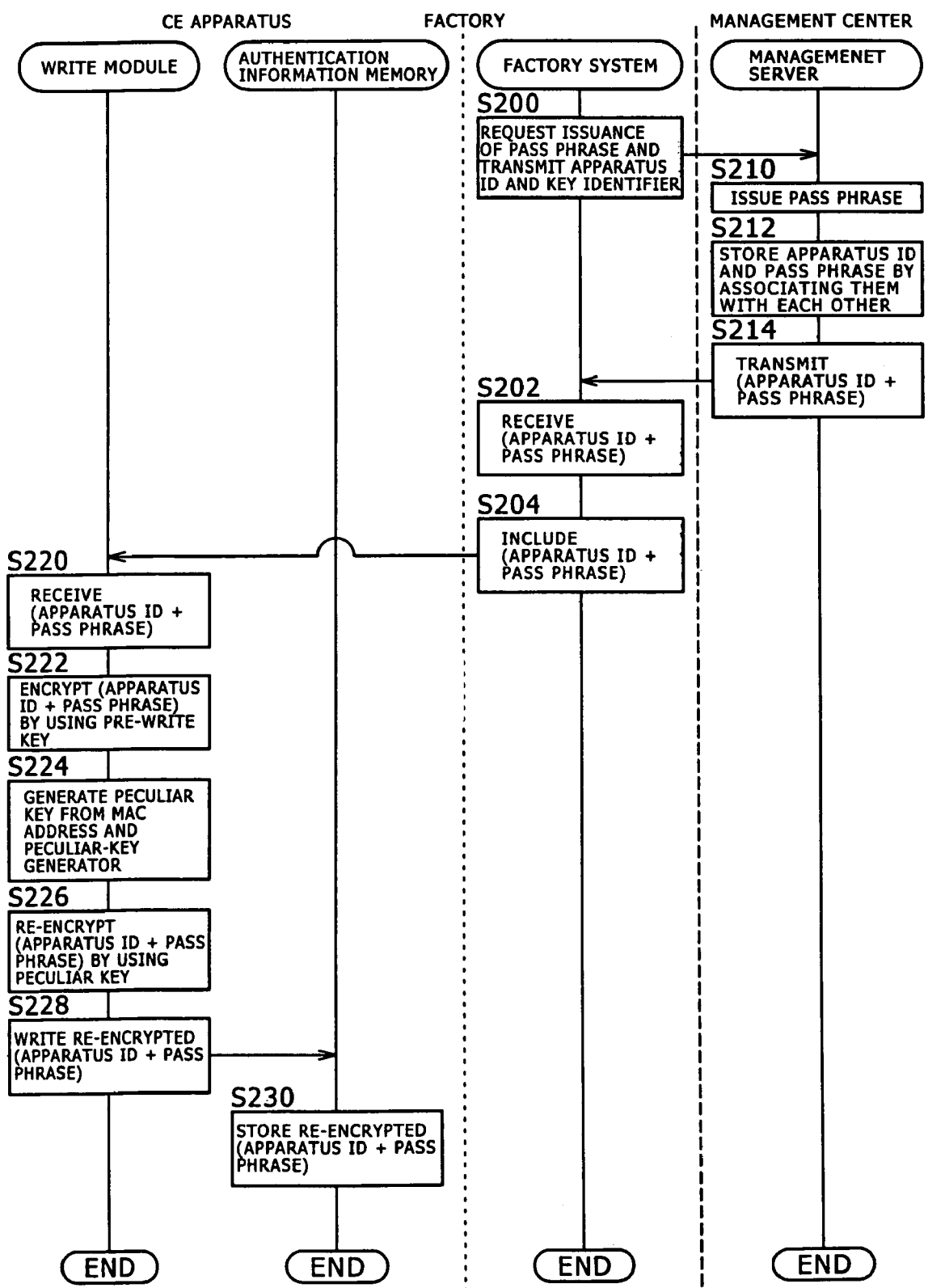
FIG. 11 shows a flowchart referred to in explanation of a procedure for including apparatus authentication information into a CE apparatus in the second embodiment.

FIG. 11 shows a flowchart referred to in explanation of a procedure for including apparatus authentication information into the CE apparatus 9.

In the procedure, the CE apparatus 9 has already been assembled and the connection means 10 has been linked to a connector of the connection means 10.

First of all, at a step 200, the factory system requests the management server 7 to issue a pass phrase and transmits a apparatus ID 41 obtained in advance from an apparatus-ID management organization to the management server 7.

It is to be noted the apparatus ID 41 is also stored in the authentication information memory 40.

At a step 210, the management server 7 issues a pass phrase in response to the request made by the factory system.

The management server 7 also has an issued apparatus authentication information table 708 like one shown in FIG. 14. The issued apparatus authentication information table 708 is a table used for storing apparatus IDs 41 received from the factory system and pass phrases issued for the apparatus. IDs 41 by associating the apparatus IDs 41 and the pass phrases with each other.

Then, at the next step 212, after issuing the pass phrase, the management server 7 associates the pass phrase with the received apparatus ID 41, storing the pass phrase and the received apparatus ID 41 in the issued apparatus authentication information table 708.

Subsequently, at the next step 214, the management server 7 generates an (apparatus ID+pass phrase) from the apparatus ID 41 and the issued pass phrase, transmitting the (apparatus ID+pass phrase) to the factory system.

The (apparatus ID+pass phrase) will become source information for generating apparatus authentication information.

At a step 202, the factory system receives the (apparatus ID+pass phrase) from the management server 7. Then, at the next step 204, the factory system supplies the (apparatus ID+pass phrase) to the CE apparatus 9 by way of the connection means 10.

At a step 220, the write module 30 employed in the CE apparatus 9 receives the (apparatus ID+pass phrase). Then, at the next step 222, the write module 30 encrypts the (apparatus ID+pass phrase) by using the pre-write key 31 to generate an encrypted (apparatus ID+pass phrase) 42.

In the case of this embodiment, the (apparatus ID+pass phrase) is used as the source information in an encryption process for generating the (apparatus ID+pass phrase) 42, which is used as the apparatus authentication information.

That is to say, the (apparatus ID+pass phrase) is converted into the encrypted (apparatus ID+pass phrase) 42 obtained as a result of a conversion process adopting a conversion technique using the pre-write key 31. The encrypted (apparatus ID+pass phrase) 42 is then-used as the apparatus authentication information.

Subsequently, at the next step 224, the write module 30 generates a peculiar key 33 from a peculiar-key generator 32 and a MAC address 51. Then, at the next step 226, the write module 30 re-encrypts the encrypted (apparatus ID+pass phrase) 42 by using the generated peculiar key 33.

This is because, in the case of this embodiment, the encrypted (apparatus ID+pass phrase) 42 itself is used as the apparatus authentication information. Thus, by holding the encrypted (apparatus ID+pass phrase) 42 in the CE apparatus 9 in a state of being further encrypted, the security of the apparatus authentication information can be further enhanced.

In the following description, the encrypted (information A+information B) put in a state of being further encrypted is referred to as a re-encrypted (information A+information B).

In this particular case, the encrypted (apparatus ID+pass phrase) 42 put in a state of being further encrypted is referred to as a re-encrypted (apparatus ID+pass phrase) 42a. Subsequently, at the next step 228, the write module 30 writes the re-encrypted (apparatus ID+pass phrase) 42a in the authentication information memory 40. Then, at the next step 230, the re-encrypted (apparatus ID+pass phrase) 42a is stored in the authentication information memory 40.

As described above, in the case of this embodiment, the apparatus ID 41 and the re-encrypted (apparatus ID+pass phrase) 42a are stored in the authentication information memory 40.

Figure 12:
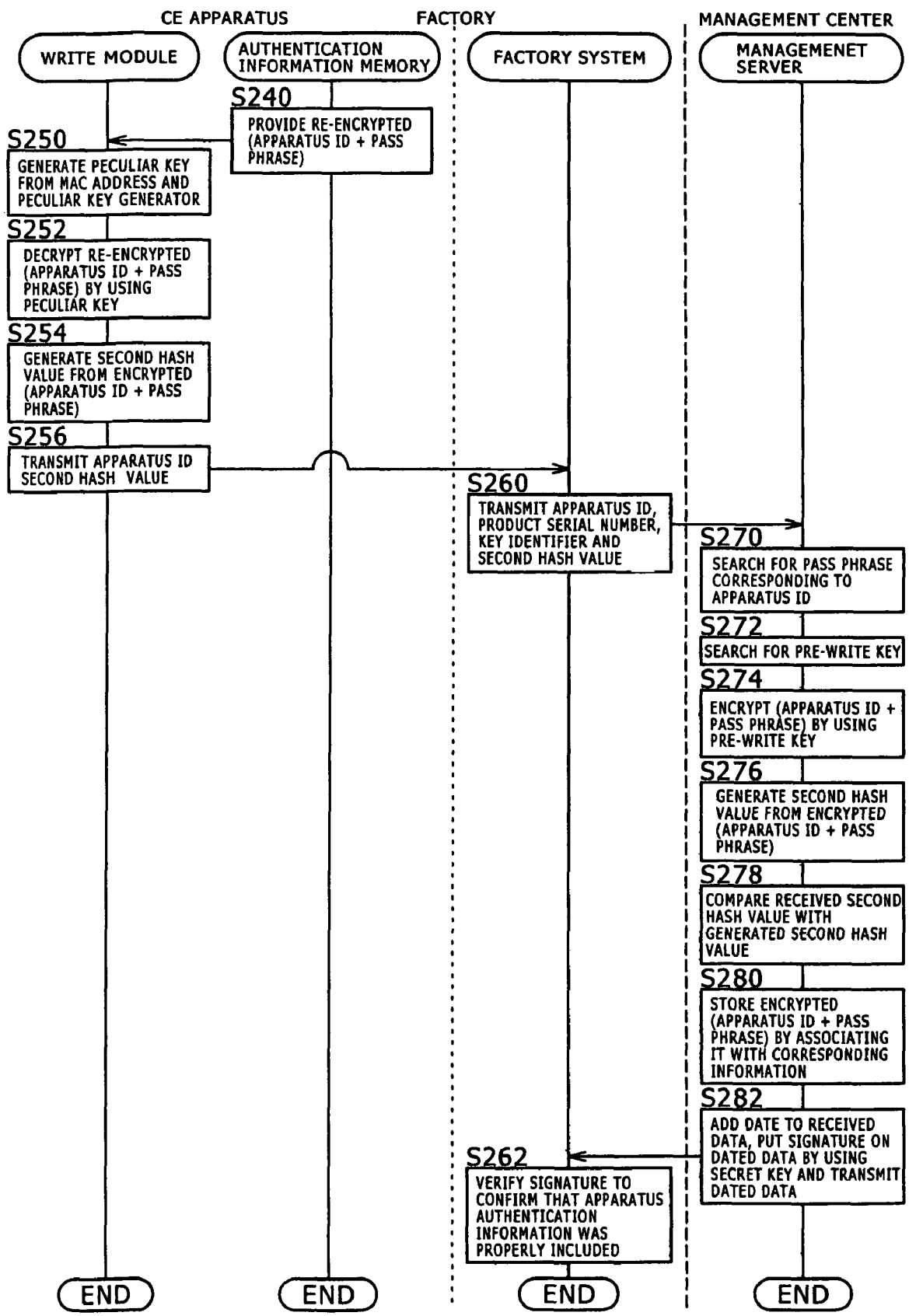
FIG. 12 shows a flowchart referred to in explanation of a procedure for verifying that apparatus authentication information has been included properly into a CE apparatus in the second embodiment.

FIG. 12 shows a flowchart referred to in explanation of a procedure executed by the management center 3 and the factory 5 to verify that apparatus authentication information has been included properly in a CE apparatus 9.

This procedure is executed with the connection means 10 already linked to a connector of the CE apparatus 9. Normally, the procedure is executed automatically after the factory system included the apparatus authentication information in the CE apparatus 9.

First of all, at a step 240, the write module 30 reads out the re-encrypted (apparatus ID+pass phrase) 42a from the authentication information memory 40. Thus, the re-encrypted (apparatus ID+pass phrase) 42a is transferred from the authentication information memory 40 to the write module 30.

Then, at a step 250, the write module 30 generates a peculiar key 33 from the peculiar-key generator 32 and the MAC address 51. Subsequently, at the next step 252, the write module 30 decrypts the re-encrypted (apparatus ID+pass phrase) 42a by using the peculiar key 33 to generate an encrypted (apparatus ID+pass phrase) 42.

Then, at step 254, the write module 30 generates a second hash value from the encrypted (apparatus ID+pass phrase) 42 by using the server-side verification hash function 35 and transmits the second hash value to the factory system at the next step 256.

In the case of the first embodiment, a second hash value is generated from an (apparatus ID+pass phrase). In the case of the second embodiment, on the other hand, a second hash value is generated from an encrypted (apparatus ID+pass phrase) 42.

It is to be noted that, in the case of the second embodiment, the first hash value is not used.

At a step 260, the factory system adds an apparatus ID 41, a product serial number and a key identifier to the second hash value received from the CE apparatus 9, transmitting the apparatus ID 41, the product serial number, the key identifier and the second hash value to the management server 7.

At a step 270, the management server 7 searches the issued apparatus authentication information table 708 shown in FIG. 14 for a pass phrase corresponding to the apparatus ID 41 received from the factory system as a pass phrase issued to the CE apparatus 9.

Then, at the next step 272, the management server 7 searches the key table 706 for a pre-write key 31 corresponding to the key identifier received from the factory system as a pre-write key 31 equal to the one stored in the CE apparatus 9.

Subsequently, at the next step 274, the management server 7 generates an (apparatus ID+pass phrase) from the apparatus ID 41 received from the factory system and the pass phrase obtained in the search process carried out at the step 270, encrypting the generated (apparatus ID+pass phrase) by using the pre-write key 31 obtained in the search process carried out at the step 272 to generate an encrypted (apparatus ID+pass phrase) 42.

Then, at the next step 276, the management server 7 generates a second hash value from the generated encrypted (apparatus ID+pass phrase) 42 by using the server-side verification-hash function 35.

Subsequently, at the next step 278, the management server 7 compares the second hash value generated at the step 276 with the second hash value received from the factory system in order to verify that the apparatus authentication information has been properly included in the CE apparatus 9.

The management server 7 has an apparatus authentication table 710 like one shown in FIG. 14. The apparatus authentication table 710 is a table used for storing apparatus IDs 41, encrypted (apparatus ID+pass phrase)s 42 each used as apparatus authentication information, product serial numbers and key identifiers by associating the elements with each other.

Then, at the next step 280, knowing that the apparatus authentication information has been included in the CE apparatus 9 properly from a result of the comparison of the second hash values with each other, the management server 7 stores the apparatus ID 41, the encrypted (apparatus ID+pass phrase) 42, the product serial number and the key identifier in the apparatus authentication table 710 by associating the elements with each other in dependence on the result of the comparison of the second hash values.

It is to be noted that the apparatus authentication table 710 is supplied to the apparatus application server 8 to be used in a process to authenticate a CE apparatus 9.

Subsequently, at the next step 282, the management server 7 adds a date, on which the data was received from the factory system, to the data and puts a digital signature on the dated data by using a secret key before transmitting the dated data to the factory system.

At a step 262, the factory system verifies the digital signature in order to confirm that the apparatus authentication information has properly included in the CE apparatus 9.

After verifying the fact that the apparatus authentication information has been included in the CE apparatus 9, the CE apparatus 9 is shipped from the factory 5 to the market.

Figure 13:
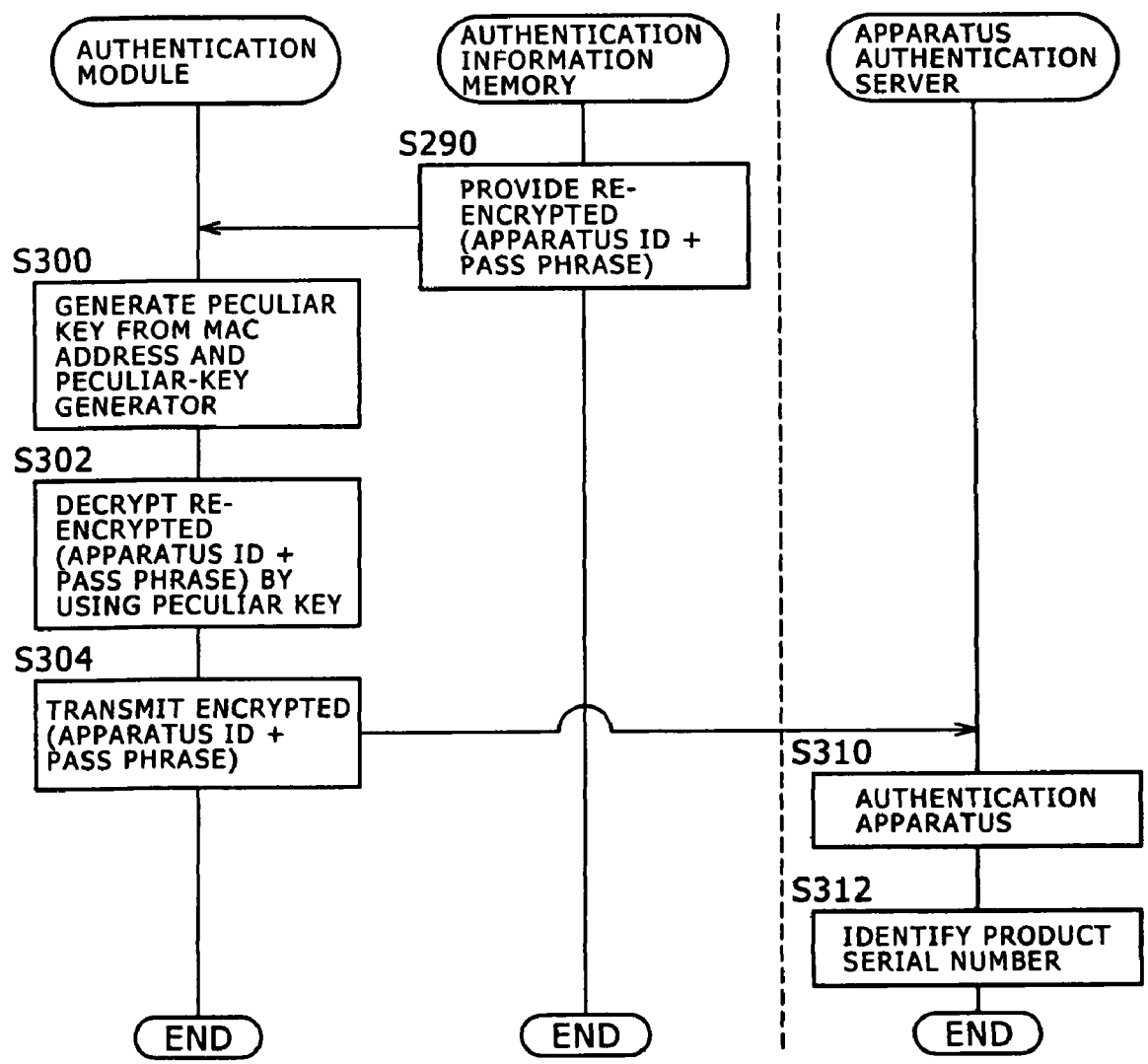
FIG. 13 shows a flowchart referred to in explanation of a procedure adopted by an apparatus authentication server as a procedure for authenticating a CE apparatus in the second embodiment.

FIG. 13 shows a flowchart referred to in explanation of a procedure adopted by the apparatus authentication server 8 as a procedure for authenticating a CE apparatus 9.

First of all, at a step 290, the authentication module 20 employed in the apparatus authentication section 99 as shown in FIG. 3 reads out the re-encrypted (apparatus ID+pass phrase) 42a from the authentication information memory 40. Thus, the re-encrypted (apparatus ID+pass phrase) 42a is transferred from the authentication information memory 40 to the authentication module 20.

Then, at a step 300, the authentication module 20 generates a peculiar key 23 by using the peculiar-key generator 22 and the MAC address 51.

Subsequently, at the next step 302, the authentication module 20 decrypts the re-encrypted (apparatus ID+pass phrase) 42a by using the peculiar key 23 to generate an encrypted (apparatus ID+pass phrase) 42. Then, at the next step 304, the authentication module 20 encrypts the encrypted (apparatus ID+pass phrase) 42 by using the public key 21 prior to transmission to the apparatus authentication server 8 along with the apparatus ID 41.

At a step 310, the apparatus authentication server 8 receives the encrypted (apparatus ID+pass phrase) 42 from the CE apparatus 9 and decrypts the encrypted (apparatus ID+pass phrase) 42 by using a secret key corresponding to the public key 21. Then, the apparatus authentication server 8 searches the apparatus authentication table 710 received from the management center 3 for an encrypted (apparatus ID+pass phrase) 42 corresponding to the apparatus ID 41 as the encrypted (apparatus ID+pass phrase) 42 of the CE apparatus 9. The apparatus authentication server 8 then compares the encrypted (apparatus ID+pass phrase) 42 found in the search process with the received encrypted (apparatus ID+pass phrase) 42 in order to authenticate the CE apparatus 9.

Subsequently, at the next step 312, the apparatus authentication server 8 searches the apparatus authentication table 710 for a product serial number corresponding to the apparatus ID 41 as the product serial number of the CE apparatus 9.

Thus, by execution of the procedure described above, the CE apparatus 9 can be authenticated.

Effects provided by the second embodiment described above are explained by comparing the embodiment with the conventional system having problems as follows.

(1): In the case of the conventional system, in order to request the management server 7 to transmit apparatus authentication information, it is necessary to make a request for an encrypted pass phrase corresponding to the pre-write key 31 stored in the CE apparatus 9. However, in the case of this embodiment, it is possible to request the management server 7 to transmit an (apparatus ID+pass phrase) without being aware of the pre-write key 31 stored in the CE apparatus 9.

(2): In the case of the conventional system, when the process to manufacture the CE apparatus 9 is stopped, an acquired (apparatus ID+pass phrase) becomes wasteful. However, in the case of this embodiment, an (apparatus ID+pass phrase) acquired from the management server 7 can be utilized by any CE apparatus. Thus, if an (apparatus ID+pass phrase) is left over, the (apparatus ID+pass phrase) can be provided to another CE apparatus 9.

(3): In the case of the conventional system, if the manufacturing line of a CE apparatus 9 is taken into consideration, free setting is impossible for each pre-write key 31. In the case of this embodiment, on the other hand, each pre-write key 31 can be set without worrying about the manufacturing line.

In the case of this embodiment, apparatus authentication information is generated in the management server 7 from source information and supplied to the apparatus authentication server 8. In this case, the source information is an (apparatus ID+pass phrase) and the apparatus authentication information is the encrypted (apparatus ID+pass phrase). However, it is to be noted that the scope of the present invention is not limited to such a configuration. For example, it is possible to provide a configuration in which the management server 7 provides source information to the apparatus authentication server 8, which then generates apparatus authentication information from the source information.

Third Embodiment

Next, a third embodiment is explained.

This embodiment updates an application including keys for encrypting and decrypting apparatus authentication information. In the following description, the application is referred to as an apparatus authentication client.

The apparatus authentication client is installed in a CE apparatus or a personal computer, forming the same modules as those of the apparatus authentication section 99 shown in FIG. 3. A usage limit and others are set for a public key corresponding to the public key 21. In some cases, it is necessary to update the public key to a new one.

In the case of the conventional system, it is necessary to replace all apparatus authentication clients with new ones when the public key is updated.

In the case of this embodiment, by replacing a module included in the apparatus authentication client as a module corresponding to one included in the apparatus authentication section 99, a public key included in the module is updated.

Figure 15:
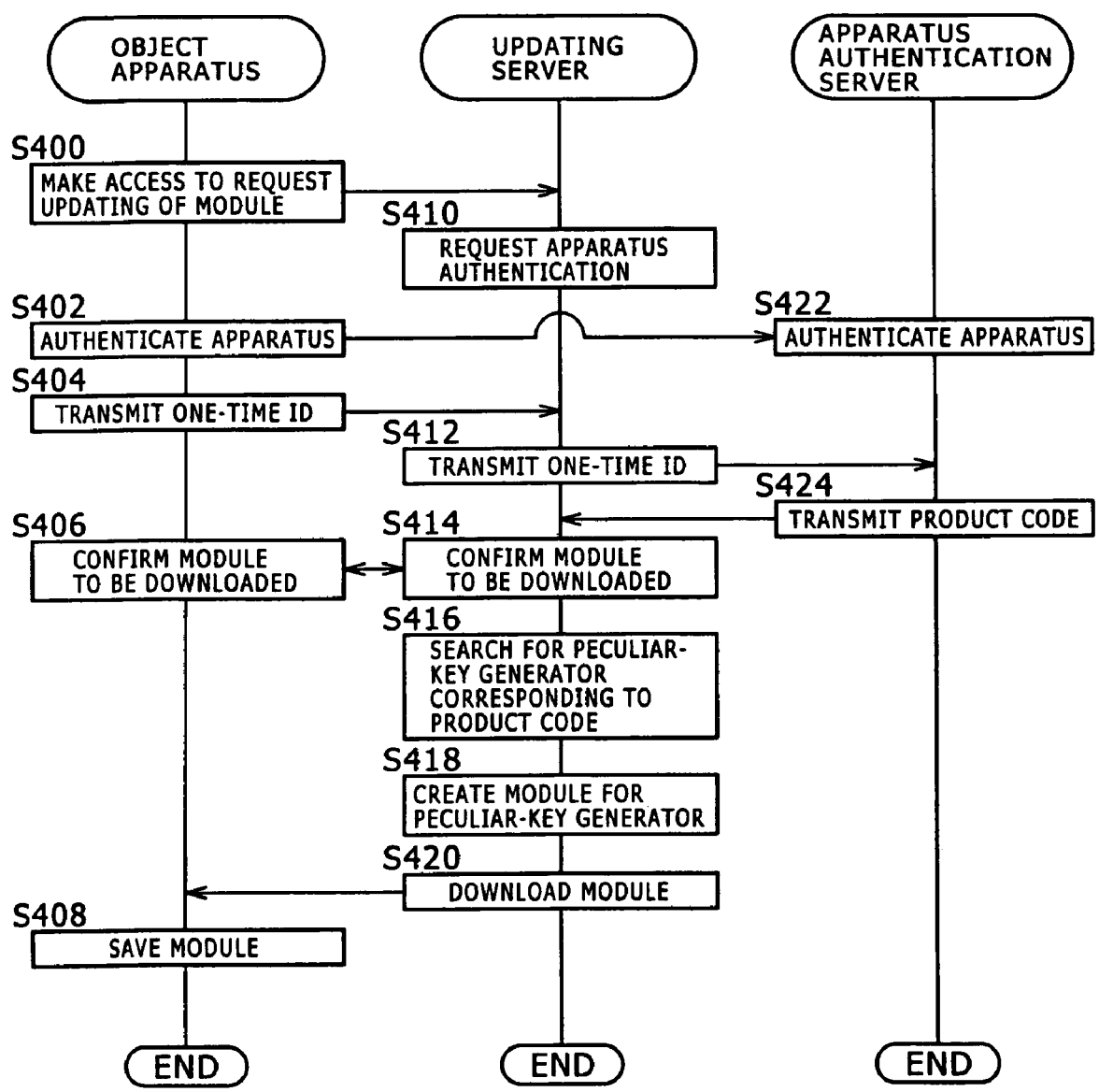
FIG. 15 shows a flowchart referred to in explanation of a procedure for updating an application including a key in a third embodiment.

By taking a case in which the apparatus authentication section 99 of the CE apparatus 9 is updated as an example, the following description exemplifies an updating procedure represented by a flowchart of FIG. 15.

It is to be noted that an updating server is a server for rendering a service to update an apparatus authentication-client. The updating server and the apparatus authentication server synchronously hold a relation between product codes, which are each used for identifying the type of a product, and peculiar-key generators.

An object apparatus is a terminal having an apparatus authentication client to be updated.

First of all, at a step 400, the object apparatus makes an access to the updating server in order to make a request for updating of a module, which is the apparatus authentication section 99 included in the apparatus authentication client.

At a step 410, the updating server makes a request for authentication of the object apparatus in response to the request made by the object apparatus.

At a step 402, the object apparatus makes an access to the apparatus authentication server. Then, at a step 422, the apparatus authentication server authenticates the object apparatus.

At that time, the apparatus authentication server issues a one-time ID and stores the one-time ID in a memory by associating the one-time ID with a product code assigned to the object apparatus. The apparatus authentication server then transmits this one-time ID to the object apparatus.

At a step 404, the object apparatus receives the one-time ID from the apparatus authentication server and transmits the one-time ID to the updating server.

At a step 412, the updating server receives the one-time ID from the object apparatus and transmits the one-time ID to the apparatus authentication server.

At a step 424, the apparatus authentication server receives the one-time ID from the updating server and transmits a product code associated with the one-time ID to the updating server.

The updating server receives the product code from the apparatus authentication server and identifies an apparatus authentication client to be updated from the product code.

Then, at steps 406 and 414, the updating server communicates with the object apparatus in order to confirm a module to be downloaded by, for example, collating the version of the apparatus authentication client on the object-apparatus side with the most recent version.

Then, at a step 416, the updating server searches for a peculiar-key generator corresponding to the product code. Subsequently, at the next step 418, the updating server generates a module corresponding to the peculiar-key generator.

At that time, a public key included in the module is the most recent one.

Then, at the next step 420, the updating server downloads the generated module to the object apparatus.

At a step 408, the object apparatus saves the downloaded module.

As described above, in the case of this embodiment, by updating the module, the public key included in the module can be updated.

Fourth Embodiment

In the case of the first embodiment, the CE apparatus 9 generates a second hash value, transmitting the second hash value to the management server 7, and the management server 7 verifies the second hash value. In the case of the fourth embodiment, on the other hand, the CE apparatus 9 transmits a result of a process to verify a first hash value to the management server 7.

Figure 16:
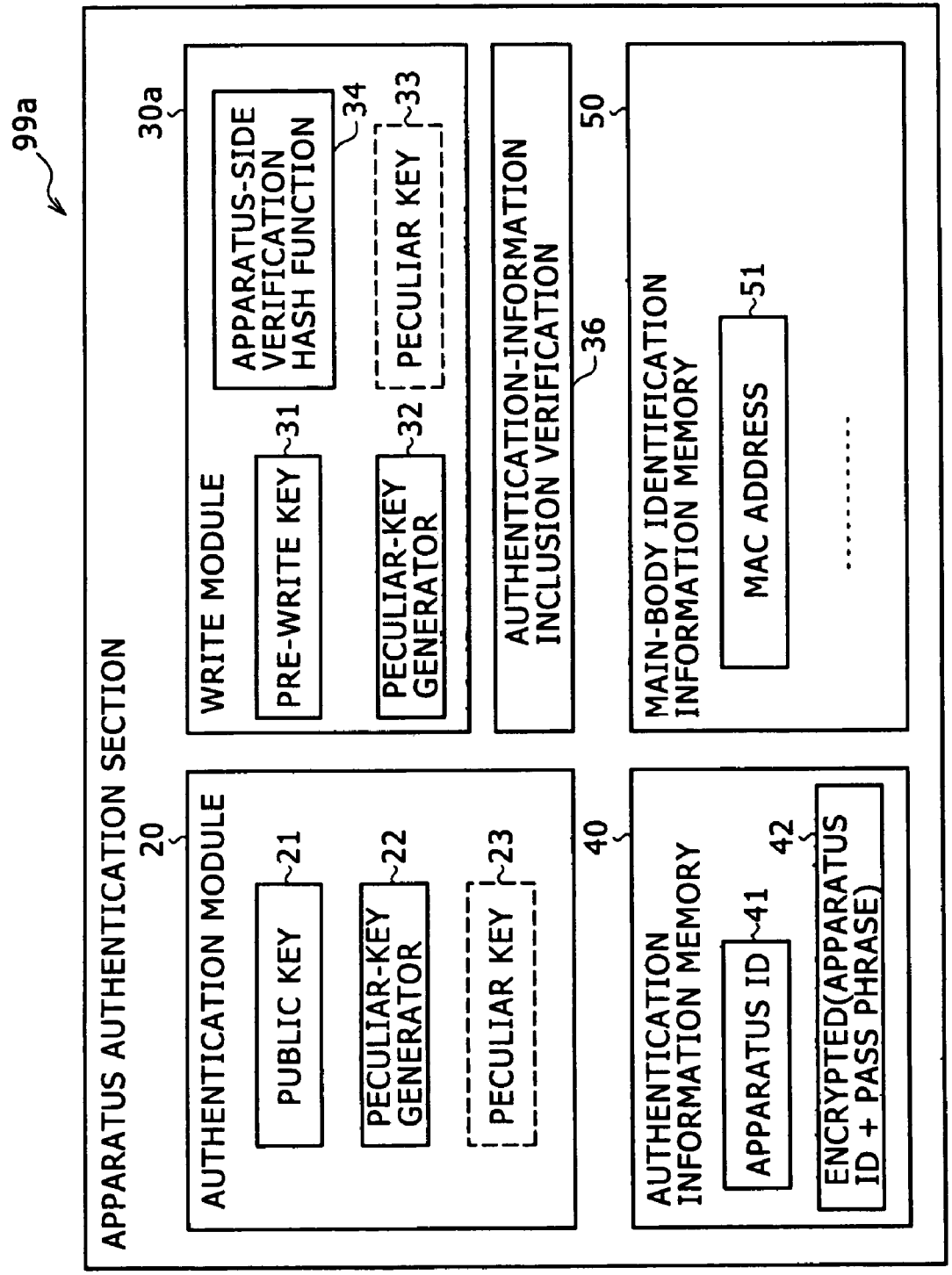
FIG. 16 is a diagram showing a typical configuration of an apparatus authentication section according to a fourth embodiment.

FIG. 16 is a diagram showing a typical configuration of an apparatus authentication section 99a. Every configuration element employed in the fourth embodiment as a configuration identical with its counterpart employed in the first embodiment is explained by denoting the configuration element by the same reference numeral as the counterpart and the explanation of the element is not given.

The apparatus authentication section 99a has an authentication information write verification module 36 for transmitting the result of a process to verify a first hash value to the management server 7.

Since it is not necessary to transmit a second hash value to the management server 7, a write module 30a does not include the server-side verification hash function 35 shown in FIG. 3.

The write module 30a is a unit for comparing a first hash value received from the management center 3 with a first hash value generated by using the apparatus-side verification hash function 34 and outputs the result of comparison to the authentication information write verification module 36.

The authentication information write verification module 36 further acquires an apparatus ID, transmitting the apparatus ID and a result of verification to the factory system by way of the connection means 10.

The factory system passes on the apparatus ID and the result of verification along with a serial number to the management server 7 employed in the management center 3. From the result of verification, the management center 3 is capable of confirming that apparatus authentication information has been included in a CE apparatus 9.

Figure 17:
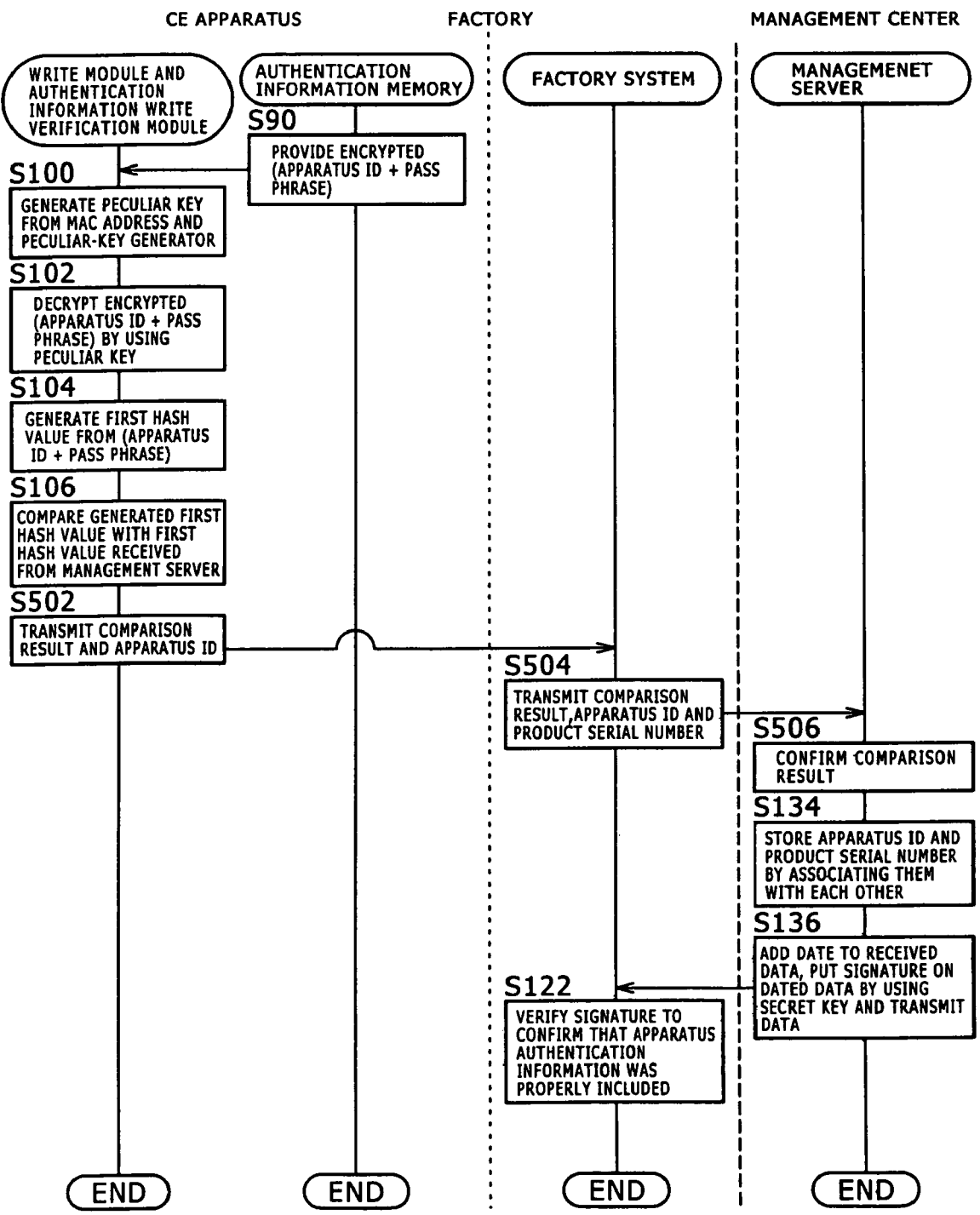
FIG. 17 shows a flowchart referred to in explanation of a procedure for verifying that apparatus authentication information has been included properly into a CE apparatus in the fourth embodiment.
Figure 18:
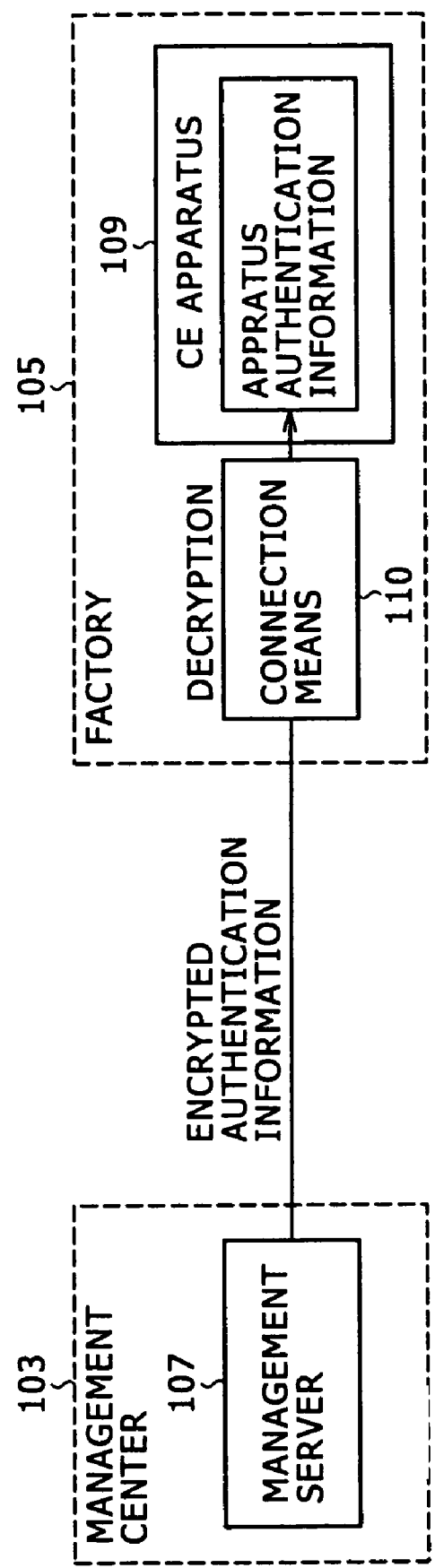
FIG. 18 is an explanatory diagram showing the conventional method for including authentication information.

FIG. 17 shows a flowchart referred to in explanation of a procedure for verifying that apparatus authentication information has been included properly into a CE apparatus in this embodiment.

Every process included in the procedure as a process identical with its counterpart in the flowchart shown in FIG. 6 is denoted by the same step number as the counterpart and its explanation is not given or simplified.

Steps 90 to 106 are identical with their respective counterparts in the first embodiment.

At the step 106, however, the write module 30a compares a first hash value generated by using the apparatus-side verification hash function 34 with a first hash value received from the management server 7 in order to determine whether or not the former and the latter are equal to each other and outputs a result of the comparison to the authentication information write verification module 36.

Then, at the next step 502, the authentication information write verification module 36 receives the result of the comparison from the write module 30a and also acquires an apparatus ID 41 through the authentication module 20. Then, the authentication information write verification module 36 outputs the result of the comparison and the apparatus ID 41 to the factory system by way of the connection means 10.

At a step 504, the factory system adds a product serial number to the result of the comparison and the apparatus ID 41, which have been received from the authentication information write verification module 36, transmitting the product serial number, the result of the comparison and the apparatus ID 41 to the management server 7.

At a step 506, the management server 7 receives the product serial number, the result of the comparison and the apparatus ID 41 from the factory system. Then, on the basis of the result of the comparison, the management server 7 verifies that the first hash value generated by using the apparatus-side verification hash function 34 and the first hash value received from the management server 7 are equal to each other, confirming that the apparatus authentication information has been included in the CE apparatus 9.

The remaining steps are the same as their respective counterparts in the first embodiment. That is to say, at a step 134, the management server 7 stores the apparatus ID 41 and the product serial number in a memory by associating the apparatus ID 41 and the product serial number with each other. Then, at the next step 136, the management server 7 adds a date on the received data, puts a signature serving as secret information on the dated data and transmits the dated data to the factory system.

At the factory system, the signature is verified in order to confirm that the apparatus authentication information has been included properly in the CE apparatus 9.

As described above, in the case of the embodiment, the management server 7 is capable of confirming that apparatus authentication information has been included in the CE apparatus 9 on the basis a result of verification.

In addition, since the management server 7 does not need to generate a second hash value, the magnitude of the load borne by the management server 7 can be reduced.

In the case of this embodiment, the write module 30a generates a first hash value. However, it is to be noted that another configuration can also be provided as a configuration in which the authentication module is provided with the apparatus-side verification hash function 34 so as to allow the authentication module to generate a first hash value. In this configuration, the authentication information write verification module 36 receives the first hash value and an apparatus ID from the authentication module and verifies that the received hash value is equal to the other one.

In addition, it is also possible to provide a configuration in which the function of the authentication information write verification module 36 is included in the write module 30a. In this case, the write module 30a transmits a result of verification to the management server 7.

The invention claimed is:

1. An apparatus authentication information system having a management server, an authentication server, and a client device and used for including apparatus authentication information in said client device as information used by an apparatus authentication server to authenticate said client device, wherein said system further comprises:

said management server provides source information including unique client device identifier used as a source for generating apparatus authentication information to said client device and provides said apparatus authentication information or said unique client device identifier to said apparatus authentication server for authenticating said client device;

said client device stores source information and generates said apparatus authentication information using said source information and, at a client device authentication time, transmits said apparatus authentication information generated from said unique client device identifier to the authentication server; and said authentication server granting access to information at the management server if the authentication information or unique client device identifier received from the management server to the apparatus is consistent with the authentication information received from the client device.

2. The apparatus authentication information system according to claim 1 wherein:

said management server provides said client device with a conversion value obtained as a result of a conversion process carried out by using a predetermined directional-function on said apparatus authentication information generated from said source information;

said client device generates a conversion value by execution of a conversion process using said predetermined directional-function on said apparatus authentication information generated from said source information; and said client device compares said generated conversion value with said conversion value received from said management server to determine whether said generated conversion value is equal to said received conversion value.

3. The apparatus authentication information system according to claim 1 wherein:

said client device provides said management server with a conversion value obtained as a result of a conversion process carried out by using a predetermined directional-function on said apparatus authentication information generated from said source information;

said management server generates a conversion value by execution of a conversion process using said predetermined directional-function on said apparatus authentication information generated from said source information; and said management server compares said generated conversion value with said conversion value received from said client device to determine whether said generated conversion value is equal to said received conversion value.

4. A client device comprising:

source-information acquisition means for acquiring source information including a unique client device identifier provided by a management server and used for generating apparatus authentication information;

generation means for generating apparatus authentication information from said acquired source information;

apparatus authentication information transmission means for transmitting said generated apparatus authentication information to an apparatus authentication server for granting access to information at the management server based on the authentication information; and receiving means for receiving information from the providing server if the authentication information transmitted by the client device is consistent with authentication information transmitted to the authentication server by the management server.

5. The client device according to claim 4 wherein:

said source information is encrypted apparatus authentication information obtained as a result of a process to encrypt said apparatus authentication information; and said generation means generates said apparatus authentication information by decrypting said encrypted apparatus authentication information.

6. The client device according to claim 4, further comprising storage means for encrypting apparatus authentication information generated by said generation means and storing a result of encrypting said apparatus authentication information, wherein said apparatus authentication information transmission means decrypts apparatus authentication information stored in said storage means and transmits a result of decrypting said apparatus authentication information.

7. The client device according to claim 6, further comprising key generation means which is used for generating an encryption key to encrypt said apparatus authentication information to be stored into said storage means and decrypt apparatus authentication information stored in said storage means by using information peculiar to said client device when it is desired to utilize said encryption key.

8. The client device according to claim 7, further comprising key deletion means for deleting said generated encryption key within a predetermined period after use of said encryption key.

9. The client device according to claim 4, further comprising:

conversion-value acquisition means for acquiring a conversion value obtained as a result of a conversion process carried out by using a predetermined one-directional function on said apparatus authentication information from said providing server;

conversion-value computation means for computing a conversion value by execution of a conversion process using said predetermined one-directional function on said generated apparatus authentication information; and determination means for determining whether said acquired conversion value is equal to said computed conversion value.

10. The client device according to claim 9, further comprising:

conversion-value computation means for computing a conversion value by execution of a conversion process using another one-directional function on said generated apparatus authentication information; and conversion-value-providing means for providing said computed conversion value to said management server.

11. The client device according to claim 4, further comprising:

conversion-value computation means for computing a conversion value by execution of a conversion process using a predetermined one-directional function on said generated apparatus authentication information; and conversion-value-providing means for providing said computed conversion value to said management server.

12. The client device according to claim 4, further comprising storage means for storing said acquired source information, wherein said apparatus authentication information transmission means generates apparatus authentication information from said stored source information and transmits said apparatus authentication information to said apparatus authentication server.

13. An apparatus authentication information processing method adopted in a client device implemented as a computer comprising source-information acquisition means, generation means and apparatus authentication information transmission means, said apparatus authentication information processing method comprising:
    acquiring, by the client device, source information including a unique client device identification from a providing server as a source used for generating apparatus authentication information;
    generating, by the client device and the providing server, apparatus authentication information from said unique client device identification;
    transmitting, by the client device, said generated apparatus authentication information;
    transmitting, by the providing server, said generated apparatus authentication information to an apparatus authentication server at an apparatus authentication time; and
    granting access to information at the management server if the authentication information or unique client device identifier received from the management server to the apparatus is consistent with the authentication information received from the client device.

14. The apparatus authentication information processing method according to claim 13 whereby:
    said source information is encrypted apparatus authentication information obtained as a result of a process to encrypt said apparatus authentication information; and
    generating further comprises decrypting said encrypted apparatus authentication information.

15. The apparatus authentication information processing method according to claim 13, further comprising encrypting apparatus authentication information generated by said generation means and storing said encrypted apparatus authentication information into a memory also employed in said computer whereby transmitting further comprises decrypting and transmitting said encrypted apparatus authentication information stored in said memory.

16. The apparatus authentication information processing method according to claim 15 wherein said computer further comprises key generation means, said apparatus authentication information processing method further generating an encryption key using information peculiar to said client device.

17. The apparatus authentication information processing method according to claim 16 further comprising deleting said generated encryption key within a predetermined period right after use of said encryption key.

18. The apparatus authentication information processing method according to claim 13 wherein said computer further comprises conversion-value acquisition means, conversion-value computation means and determination means, said apparatus authentication information processing method further comprising:
    acquiring a conversion value using a predetermined one-directional function on said apparatus authentication information from said providing server;
    computing, using said conversion value computation means, a said predetermined one-directional function to said generated apparatus authentication information; and
    determining, using said determination means whether or not said acquired conversion value is equal to said computed conversion value.

19. The apparatus authentication information processing method according to claim 18 wherein said computer further comprises conversion-value computation means and conversion-value-providing means, said apparatus authentication information processing method further including:
    computing, using said conversion-value computation means, a conversion value by execution of a conversion process using another one-directional function on said generated apparatus authentication information; and
    providing, using said conversion-value-providing means, said computed conversion value to said management server.

20. The apparatus authentication information processing method according to claim 13 wherein said computer further comprises conversion-value computation means and conversion-value-providing means, said apparatus authentication information processing method further including:
    computing, using said conversion-value computation means, a conversion value by execution of a conversion process using a predetermined one-directional function on said generated apparatus authentication information; and
    providing, using said conversion-value-providing means, said computed conversion value to said management server.

21. The apparatus authentication information processing method according to claim 13 wherein said computer further comprises a memory for storing said acquired source information and, wherein transmitting further comprises generating apparatus authentication information using said stored source information and transmitting said generated apparatus authentication information to said apparatus authentication server.

22. A storage medium, which can be read by a computer and is used for storing an apparatus authentication information processing program to be executed by said computer to perform a method comprising:
    acquiring, by the client device, source information including a unique client device identification provided by a providing server and used for generating apparatus authentication information;
    generating, by the client device and the providing server, apparatus authentication information using said unique client device identification;
    transmitting by said providing server said generated apparatus authentication information to an apparatus authentication server at an apparatus authentication time; and
    granting access to information at the management server if the authentication information or unique client device identifier received from the management server to the apparatus is consistent with the authentication information received from the client device.

23. A providing server comprising:
    source-information-providing means for providing a client device with source information including unique client device identifier used as a source for generating apparatus authentication information;
    apparatus authentication information providing means for providing said apparatus authentication information or said source information to an apparatus authentication server for authenticating said client device;
    conversion-value acquisition means for acquiring a conversion value by using a predetermined one-directional function on apparatus authentication information generated based on said source information from said client device;

conversion-value computation means for computing a conversion value using said one-directional function based on said apparatus authentication information; and determination means for determining whether said acquired conversion value is equal to said computed conversion value.

24. The providing server according to claim 23, further comprising determination-result transmission means for transmitting a result produced by said determination means to a main organization.

25. A storage medium, which can be read by a computer and is used for storing an apparatus authentication information processing program to be executed by said computer to perform a method comprising:

providing a client device with source information including unique identification information peculiar to the client device used as a source for generating apparatus authentication information;

function of providing said apparatus authentication information or said source information to an apparatus authentication server for authenticating said client device;

acquiring a conversion value obtained as a result of a conversion process carried out by using a predetermined one-directional function on apparatus authentication information generated on the basis of said source information from said client device;

computing a conversion value by execution of a conversion process using said one-directional function on said apparatus authentication information; and producing a result of determination as to whether or not said acquired conversion value is equal to said computed conversion value.

* * * * *